(12) United States Patent
Merwaday et al.

(10) Patent No.: US 9,883,347 B2
(45) Date of Patent: *Jan. 30, 2018

(54) SPECIFIC VELOCITY ESTIMATION OF WIRELESS NETWORK DEVICES

(71) Applicants: Arvind Merwaday, Miami, FL (US); Ismail Guvenc, Miami, FL (US)

(72) Inventors: Arvind Merwaday, Miami, FL (US); Ismail Guvenc, Miami, FL (US)

(73) Assignee: The Florida International University Board of Trustees, Miami, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/370,213

(22) Filed: Dec. 6, 2016

(65) Prior Publication Data

US 2017/0094472 A1 Mar. 30, 2017

Related U.S. Application Data

(63) Continuation of application No. 14/749,054, filed on Jun. 24, 2015.

(51) Int. Cl.
*H04W 24/00* (2009.01)
*H04W 4/02* (2009.01)
(Continued)

(52) U.S. Cl.
CPC ........... *H04W 4/027* (2013.01); *H04W 4/021* (2013.01); *H04W 36/32* (2013.01);
(Continued)

(58) Field of Classification Search
CPC ............... H04W 4/027; H04W 72/048; H04W 36/0083; H04W 36/0088; H04W 36/32; H04W 4/021
See application file for complete search history.

(56) References Cited

U.S. PATENT DOCUMENTS 8,243,613 B2 8/2012 Park et al.
9,313,619 B2 * 4/2016 Meredith .............. H04W 4/028
(Continued)

FOREIGN PATENT DOCUMENTS

CN 100407873 C 7/2008
EP 2 187 671 5/2010
(Continued)

OTHER PUBLICATIONS

"Cisco Visual Networking Index: Global Mobile Data Traffic Forecast Update, 2014-2019 (White Paper)," *Cisco Systems*, updated Feb. 3, 2015.
(Continued)

*Primary Examiner* — Barry Taylor
(74) *Attorney, Agent, or Firm* — Saliwanchik, Lloyd & Eisenschenk

(57) ABSTRACT

Techniques are disclosed for determining a specific velocity of a device attached to a wireless network. The specific velocity can be determined using a handover count of the base station boundary transitions over a time window and/or using a set of sojourn time samples that each denote the duration the device remains in the zone of a particular base station. Techniques operate effectively in cellular networks having high base station densities. The specific velocity estimates may be inputs to components on the device or network to adjust a local device function or performance behavior.

14 Claims, 12 Drawing Sheets

(51) Int. Cl.
*H04W 36/32* (2009.01)
*H04W 72/04* (2009.01)
*H04W 36/00* (2009.01)

(52) U.S. Cl.
CPC ...... *H04W 72/048* (2013.01); *H04W 36/0083* (2013.01); *H04W 36/0088* (2013.01)

(56) References Cited

U.S. PATENT DOCUMENTS

| | | | | |
|---|---|---|---|---|
| 9,392,533 | B1* | 7/2016 | Vivanco | H04W 48/16 |
| 2008/0176583 | A1* | 7/2008 | Brachet | G01S 5/0236 |
| | | | | 455/456.3 |
| 2009/0240464 | A1* | 9/2009 | Dietz | G01S 11/10 |
| | | | | 702/143 |
| 2012/0135734 | A1* | 5/2012 | Ma | H04W 36/245 |
| | | | | 455/436 |
| 2012/0252463 | A1* | 10/2012 | Zou | G01S 5/021 |
| | | | | 455/441 |
| 2015/0049681 | A1* | 2/2015 | Huang | H04W 72/1289 |
| | | | | 370/329 |
| 2015/0111581 | A1* | 4/2015 | Yiu | H04W 4/22 |
| | | | | 455/437 |
| 2015/0215830 | A1* | 7/2015 | Dalsgaard | H04W 36/0094 |
| | | | | 455/444 |
| 2016/0081001 | A1* | 3/2016 | Xu | H04W 36/04 |
| | | | | 370/331 |
| 2016/0196527 | A1* | 7/2016 | Bose | G06Q 10/0832 |
| | | | | 705/332 |

FOREIGN PATENT DOCUMENTS

| | | |
|---|---|---|
| WO | WO 2013/023346 A1 | 2/2013 |
| WO | WO 2013/055430 A2 | 4/2013 |
| WO | WO 2013/055430 A3 | 4/2013 |

OTHER PUBLICATIONS

"Evolved Universal Terrestrial Radio Access (E-UTRA); Radio Resource Control (RRC); Protocol specification," *3GPP*, accessed from http://www.3gpp.org/dynareport/36331.htm, page generated from database on Jun. 26, 2015.

"Mobility support to pico cells in the co-channel HetNet deployment," *Samsung*, Jun. 28-Jul. 2, 2010, Stockholm, Sweden, 3GPP Standard Contribution (R2-104017).

"The 1000x Mobile Data Challenge: More Small Cells, More Spectrum, Higher Efficiency," accessed from https://www.qualcomm.com/documents/1000x-mobile-data-challenge, *Qualcomm*, Nov. 2013.

"User Equipment (UE) procedures in idle mode," *3GPP*, accessed from http://www.3gpp.org/dynareport/36304.htm, page generated from database on Jun. 26, 2015.

Bao, Wei et al., "Handoff Rate Analysis in Heterogeneous Cellular Networks: a Stochastic Geometric Approach," *Proc. ACM Int. Conf. on Modeling, Analysis and Simulation of Wireless and Mobile Systems*, Montreal, Quebec, Canada, Sep. 2014, pp. 95-102.

Ferenc, Járai-Szabó et al., "On the size-distribution of Poisson Voronoi cells," *Physica A: Statistical Mechanics and its Applications*, 2007, 385(2):518-526.

Ishii, Hiroyuki et al., "A Novel Architecture for LTE-B: C-plane/ U-plane Split and Phantom Cell Concept," *Proc. IEEE Global Telecommun. Conf (GLOBECOM) Workshops*, 2012, pp. 624-630.

Lin, Xingqin et al., "Towards Understanding the Fundamentals of Mobility in Cellular Networks," *IEEE Trans. Wireless Commun.*, Apr. 2013, 12(4):1686-1698.

López-Pérez, David et al., "Mobility Management Challenges in 3GPP Heterogeneous Networks," *IEEE Communications Magazine: Topics in Radio Communications*, Dec. 2012, 50(12):70-78.

Sadr, Sanam et al., "Handoff Rate and Coverage Analysis in Multi-tier Heterogeneous Networks," IEEE Trans. Wireless Commun., Jan. 2015, 14(5):2626-2638.

Tanemura, Masaharu. "Statistical Distributions of Poisson Voronoi Cells in Two and Three Dimensions," *Forma*, 2003, 18:221-247.

Zhao, Lin et al., "Recursive Maximum Likelihood Estimation of Maximum Doppler Frequency of a Sampled Fading Signal," *Proc. Biennial Sym. on Commun.*, 2000, pp. 316-365.

Zhou, Bin et al., "Doppler Frequency Estimation in Multipath Fading Channels," *Proc. Sixth Can. Workshop on Info. Theory*, Jun. 1999, pp. 111-114.

* cited by examiner

SPECIFIC VELOCITY ESTIMATION OF WIRELESS NETWORK DEVICES

CROSS-REFERENCE TO RELATED APPLICATION

This application is a continuation application of U.S. application Ser. No. 14/749,054, filed Jun. 24, 2015, the disclosures of which is hereby incorporated by reference in its entirety, including any figures, tables, and drawings.

GOVERNMENT SUPPORT

This invention was made with government support under grant number AWD3950 awarded by the National Science Foundation. The government has certain rights in the invention.

BACKGROUND

Since the introduction of advanced mobile devices with data-intensive applications, cellular networks are witnessing rapidly increasing data traffic demands from mobile users. To keep up with the increasing traffic demands, cellular networks are being transformed into heterogeneous networks (HetNets) by the deployment of small cells (e.g., picocell, femtocell, etc.) over the existing macrocells. Cisco has recently predicted an 11-fold increase in global mobile data traffic between 2013 and 2018 [1], while Qualcomm has predicted an astounding 1000× increase in mobile data traffic [2]. Addressing this challenge will lead to extreme densification of the small cells, which will give rise to hyper-dense heterogeneous networks (HDHNs).

Mobility management in cellular networks is an important aspect of providing good quality of service to mobile users by minimizing handover failures. In homogeneous networks that only have macrocell base stations (MBSs), handovers are typically finalized at the cell edge due to the large cell sizes. With the deployment of small cell base stations (SBSs), it becomes more difficult to finalize the handover process at the cell edge for the device or user equipment (UE) due to the smaller cell size [3], [4].

In particular, high-mobility devices may run deep inside the coverage areas of small cells before finalizing a handover, thus incurring handover failure because of degraded signal to interference plus noise ratio (SINR). These challenges motivate the need to set handover parameters according to accurate UE velocity estimations and target cell size.

Existing LTE and LTE-Advanced technologies are capable of estimating the mobility state of a UE into three broad classes: low, medium, and high-mobility [4]-[6]. This is achieved on the device by counting the number of handovers within a given time window and comparing it with a threshold of the device. A velocity estimate can also be implemented at the network side by tracking the prior history of handovers for a particular UE. The coarse mobility state estimate can then be used, for example, to modify handover related parameters. While more accurate UE-side speed estimation techniques based on Doppler estimation have been discussed in [9]-[12], due to their complexity and standardization challenges, they have not been adopted in existing cellular network standards.

BRIEF SUMMARY

The subject invention describes techniques for determining the specific velocity of a device attached to a wireless network.

In some embodiments, the specific velocity is determined using a handover count of the base station boundary transitions over a predefined time window. The handover count and time window, along with the base station density that can be received periodically from the wireless network, are used as inputs to a velocity estimator.

In some embodiments, the velocity estimator may achieve the Cramer-Rao Lower Bound (CRLB) for velocity estimation. In certain embodiments, the CRLB for velocity estimation is derived from an approximation of the probability mass function (PMF) of the handover count. In some embodiments, the approximation of the PMF is derived from a gamma probability density function (PDF). In some embodiments, the approximation of the PMF is derived from a normal PDF.

The velocity estimator itself may be determined according to varying embodiments of the invention. In some embodiments, the velocity estimator is a minimum variance unbiased estimator. In other embodiments, the velocity estimator can include a best linear unbiased estimator, maximum likelihood estimator, least squared estimator, method of moments estimator, and a Bayesian estimator.

In some embodiments, the specific velocity is determined using a set of sojourn time samples that each denote the duration the device remains in the zone of a particular base station. The samples may be received from a capability or measurement module of the device. The plurality of sojourn time samples can be represented as a vector that, along with the base station density that can be periodically received from the wireless network, are used as inputs to a velocity estimator. In further embodiments involving sojourn time, the velocity estimator can achieve a Cramer-Rao Lower Bound (CRLB) for velocity estimation that is derived from a joint probability density function (JPDF) derived from the vector of the plurality of sojourn time samples.

Some embodiments may determine the specific velocity by utilizing both the handover count and the sojourn time samples.

Techniques of the subject invention may be implemented in some embodiments as processing instructions in a velocity estimator component that receives input, such as handover count or sojourn time samples, periodically retrieves the base station density from the network, determines a velocity estimate according to one or more of the described techniques, and sends the velocity estimate to a receiving component.

In some embodiments, a component on the device can receive the specific velocity estimate and use the velocity as an input to a local device function, such as power management. In some embodiments, the receiving component can reside on a wireless network controller present on the wireless network, for example, on a small or macro base station or on a component reachable through a base station. Such a component may assist the wireless network in attempting to optimize one or more performance behaviors (e.g., mobility or interference management) using the specific velocity estimate as an input. Some embodiments may operate in a wireless network using phantom cells.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1A:
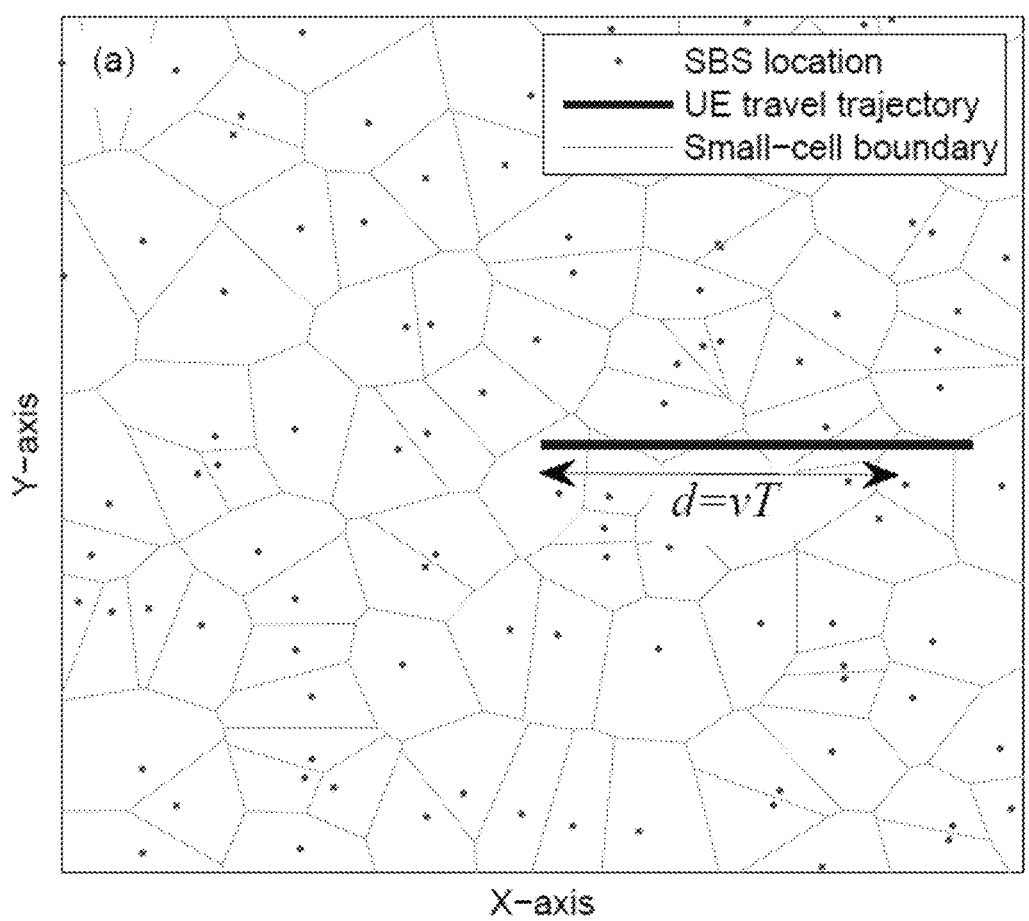
FIG. 1A shows base stations and cells of a wireless network.

The subject invention describes techniques for determining the specific velocity of a device attached to a wireless network. In some embodiments, the specific velocity is determined using a handover count of the base station boundary transitions over a time window. In some embodiments, the specific velocity is determined using a set of sojourn time samples that each denote the duration the device remains in the zone of a particular base station. Some embodiments may determine the specific velocity by utilizing both the handover count and the sojourn time samples.

The term "device" refers to varieties of user device or user equipment. Some examples of user devices include cellular phones, mobile phones, smartphones, tablet computers and/or laptop computers with wireless network connectivity, and automobiles with onboard assistance systems. Devices of this nature have wireless modems or cellular radios embedded or attached that provide connectivity to the containing device. Further examples include "Internet of Things" (IoT) devices, which may have components for low-power wireless network connectivity. Example component environments for a device are described with respect to FIG. 10.

In some embodiments, the device attaches to a wireless network that is a cellular network. Examples of cellular networks include LTE, CDMA, and GSM. In the UMTS and LTE system, the device may be referred to as "user equipment," or UE, and in GSM systems, it may be called the "mobile station," or MS. However, techniques and systems described herein can refer to other types of wireless network that are implemented such that a moving device connected to the wireless network transitions through a series of connectivity zones or cells defined by base stations.

In certain embodiments of the subject invention, a handover count can be received from the device of the base station boundary transitions made by the user over a predefined time window. The handover count and time window, along with the base station density that may be periodically received from the wireless network, are used as inputs to a velocity estimator.

In some embodiments, the velocity estimator may achieve the Cramer-Rao Lower Bound (CRLB) for velocity estimation. The CRLB for velocity estimation does not directly estimate the velocity, but can serve as a lower bound on the velocity estimator and may be used to determine the lowest estimation error that can be achieved by the estimator. The CRLB may be derived in various ways. In some cases, the CRLB can be derived from an approximation of the probability mass function (PMF) of the handover count. In some embodiments, the approximation of the PMF is derived from a gamma probability density function (PDF). In some embodiments, the approximation of the PMF is derived from a normal PDF.

The velocity estimator itself may be determined according to varying embodiments of the invention. In some embodiments, the velocity estimator is a minimum variance unbiased estimator. In other embodiments, the velocity estimator can include a best linear unbiased estimator, maximum likelihood estimator, least squared estimator, method of moments estimator, and a Bayesian estimator.

In certain embodiments of the subject invention, a plurality of sojourn time samples can be received, each of which denotes the duration a device remains in a zone of a particular base station. The samples may be received from a capability or measurement module of the device. The plurality of sojourn time samples can be represented as a vector that, along with the base station density that may be periodically received from the wireless network, are used as inputs to a velocity estimator.

In some embodiments involving sojourn time, the velocity estimator achieves a Cramer-Rao Lower Bound (CRLB) for velocity estimation that is derived from a joint probability density function (JPDF) derived from the vector of the plurality of sojourn time samples.

Techniques of the subject invention may be implemented in some embodiments as processing instructions in a velocity estimator component that receives input, such as handover count or sojourn time samples, periodically retrieves the base station density from the network, determines a velocity estimate according to one or more of the described techniques, and sends the velocity estimate to a receiving component.

In some embodiments, the receiving component may be on the device itself. Components on the device can receive the specific velocity estimate and use the velocity as an input to a local device function, such as power management. Knowing a specific velocity of the device can, for example, assist the device in optimizing wireless radio power output and thereby saving battery power in some instances.

In some embodiments, the receiving component can reside on a wireless network controller present on the wireless network, for example, on a small or macro base station or on a component reachable through a base station. Such a component may assist the wireless network in attempting to optimize one or more performance behavior using the specific velocity estimate as an input. Performance behaviors can include mobility management (the tracking of devices so that information can be appropriately routed to them through the proper base station) and interference management, which includes adjusting base station power output to reduce the negative effects of overlapping or interfering zones. Performance behaviors can be adjusted for all, or for a subset, of the wireless network or the devices on the wireless network.

Mobility state estimation that classifies a device's mobility into three discrete "states" (i.e., low, medium, and high) based on handover count has been implemented in LTE since release 8. Such coarse categorizations tend to be inaccurate, and may even be ineffective, as the density of the base stations (and the number of base station zones or regions) increases. Techniques of the subject invention address the lack of accurate estimates of device velocity. Having a specific velocity estimate (rather than a coarse categorization) may improve device performance in a variety of areas, including mobility management, power saving, cell selection, and interference management.

Numerous advantageous technical effects may result from these technical features, enhancing the performance both of the device itself and the wireless network in whole or in part. More granular or specific device velocities (rather than merely the low, medium, and high categorizations of existing capabilities) enable the device and the network to make more intelligent decisions regarding key functions.

Furthermore, the techniques of the subject invention may allow velocity estimation to be a useful metric for determining or adjusting behaviors on a device and/or wireless network in highly dense base station environments. As noted above, existing coarse estimation techniques may be nearly ineffective in wireless networks having highly dense base stations. For instance, examples described herein indicate that techniques of the subject invention increase in accuracy as the base station density increases and as longer predetermined time windows for handover count measurement are used. These techniques may allow seamless connectivity to broadband networks and higher throughputs throughout the network, which might in turn enable wider use of capabilities such as high definition video streaming.

In an embodiment of the subject invention, a HetNet may have both macro base stations (MBSs) and small base stations (SBSs). The MBSs tier and the SBSs tier may use orthogonal frequency bands as described in Ishii et al. (A novel architecture for LTE-B: C-plane/U-plane split and phantom cell concept, in *Proc. IEEE Global Telecommun. Conf.* (GLOBECOM) Workshops, 2012, pp. 624-630; which is incorporated herein by reference).

High-traffic outdoor environments that can also support good mobility and connectivity may be implemented using "phantom cells," or macro-assisted small cells. In phantom cells (also referred as dual connectivity), the device is always connected to, and receives a control channel from, a macrocell. When there is data to be received from small cells, the device can also be simultaneously connected to small cells. Phantom cells may split the C-plane and U-plane. The C-plane of the device in small cells is provided by a macrocell in a lower frequency band, while for the device in macrocells both the C-plane and U-plane are served by the macrocell, as in the conventional system. Meanwhile, the U-plane of the device in small cells is provided by a small cell using a higher frequency band. A benefit of phantom cells is that control signaling due to frequent handover between small cells and macrocells and among small cells can be significantly reduced, and connectivity can be maintained even when using small cells and higher frequency bands. (Nakamura et al., Trends in small cell enhancements in LTE advanced, in *IEEE Communications Magazine*, February 2013, p. 98-105, which is incorporated herein by reference).

In embodiments using HetNets (including phantom cells), the SBSs are randomly located according to a homogeneous Poisson point process (PPP) with intensity $\lambda$. Each SBS forms a region, zone, or cell in which it can communicate with the device as it travels. During the travel, the device can determine whenever it crosses the boundary of a small cell. Generally herein, the boundary crossings of the device across the small cell transitions are called "handovers." Thus, the device is capable of counting the number of handovers it experiences in a given time window. As shown in FIG. 1A, the small cells of the network can be represented as a Poisson-Voronoi tessellation with a simple device mobility scenario, in which the device travels along a straight line trajectory with constant velocity v.

Figure 1B:
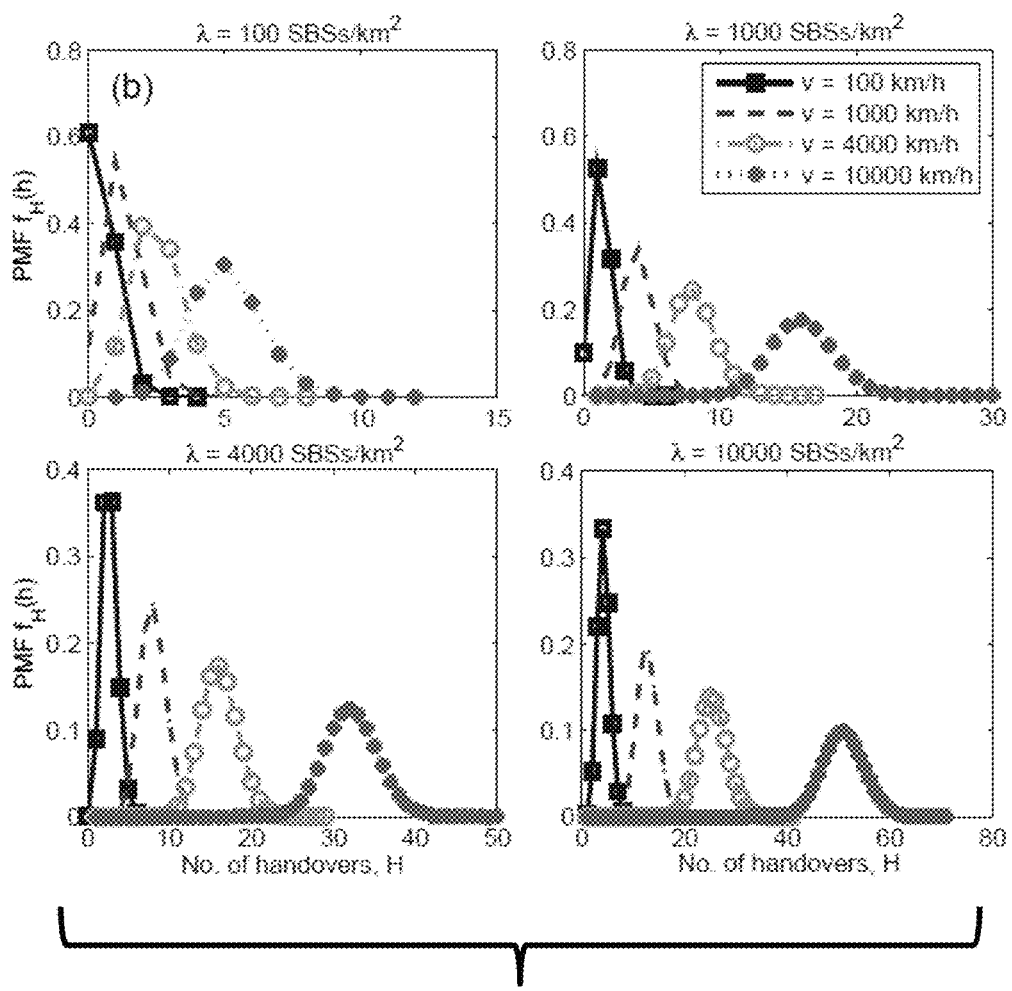
FIG. 1B shows plots of the probability mass function of the number of handovers for different velocities and base station densities.

The number of handovers H made by the device during a measurement period T is equal to the number of intersections between the device's travel trajectory (of length d=vT) and the small cell boundaries. The number of handovers H is a discrete random variable and its statistics does not change with the direction of device travel because the SBS locations are modeled as a homogeneous and stationary PPP. FIG. 1B shows the probability mass function (PMF) of the number of handovers $f_H(h)$ obtained through simulations using different settings of $\lambda$ and v, while the travel time of the device is fixed to T=12 seconds. It should be noted that the shape of the PMF may change depending on the parameters $\lambda$ and v, and that, for large $\lambda$ or v values, the shape of the PMF resembles a normal distribution.

An exact expression for the mean number of handovers can be derived as described in Lin et al. (Towards understanding the fundamentals of mobility in cellular networks, *IEEE Trans. Wireless Commun.*, vol. 12, no. 4, pp. 1686-1698, April 2013; which is incorporated herein by reference), and Moller (*Lectures On Random Voronoi Tessellations*, Springer-Verlag, 1994; which is incorporated herein by reference):

$$E[H] = \frac{4vT\sqrt{\lambda}}{\pi}. \tag{1}$$

Determining the Cramer-Rao Lower Bound (CRLB) for velocity estimation may require an expression for the PMF $f_H(h)$. Deriving an expression for the PMF $f_H(h)$ is a complicated and laborious job, which might result in a mathematically intractable expression [18]. However, an approximation to the PMF $f_H(h)$ may be derived in various ways, depending on the embodiment.

In one embodiment, an approximation of the PMF $f_H(h)$ may be derived using gamma distribution techniques; it will be called $f_H^g(h)$. In another embodiment, an approximation of the PMF $f_H(h)$ may be derived using normal distribution techniques; it will be called $f_H^n(h)$.

Approximation of the PMF $f_H(h)$ Using Gamma Distribution

Figure 2:
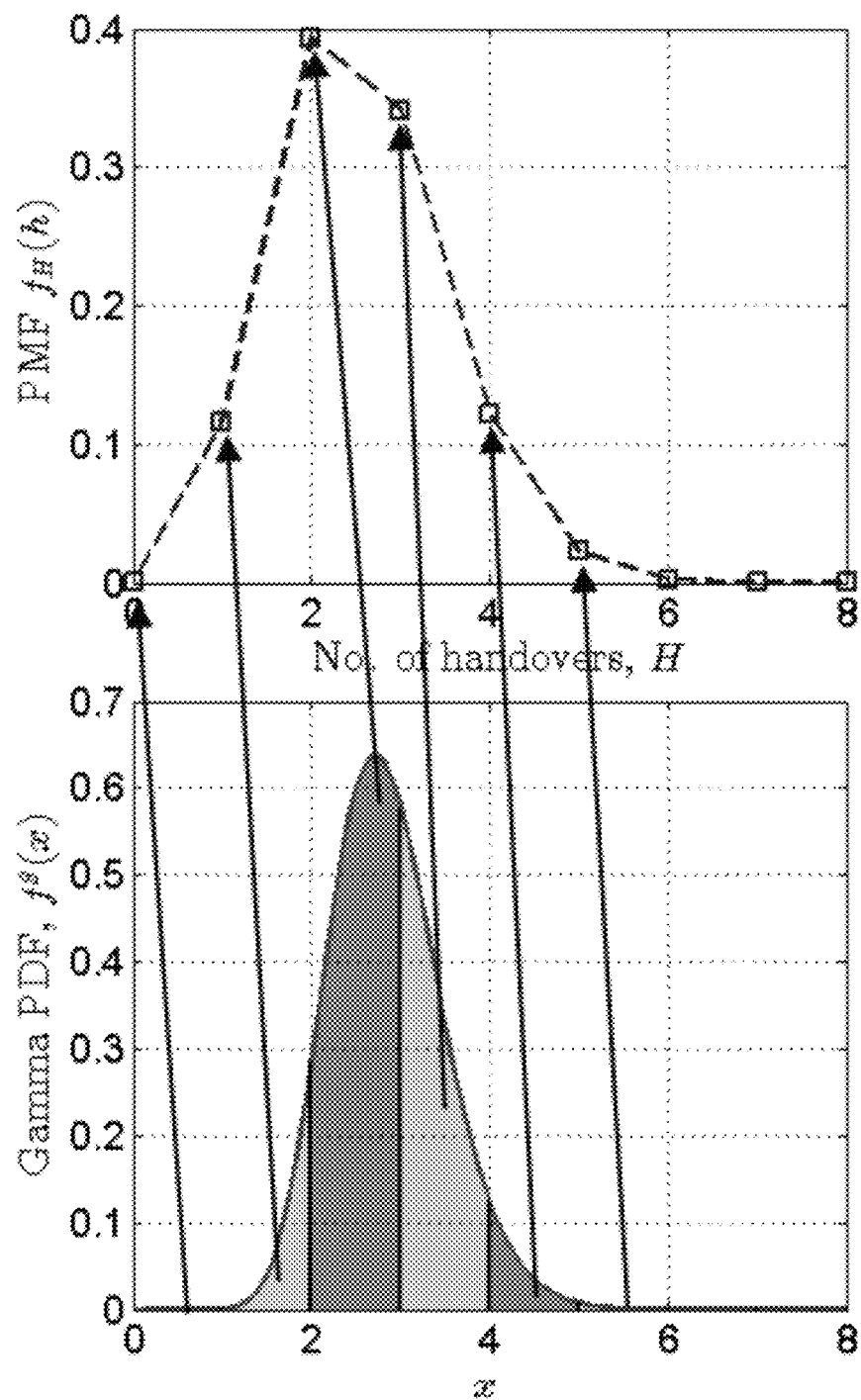
FIG. 2 shows an illustration of fitting using a Gamma distribution.

The gamma probability density function (PDF) can be expressed using the shape parameter $\alpha>0$ and rate parameter $\beta>0$ as, $$f^g(x; \alpha, \beta) = \frac{\beta^\alpha}{\Gamma(\alpha)} x^{\alpha-1} e^{-\beta x}, \text{ for } x \in (0, \infty), \tag{2}$$

where $\Gamma(\alpha)=\int_0^\infty t^{\alpha-1}e^{-t}dt$ is the gamma function. Fitting the gamma PDF to the PMF $f_H(h)$ is not a straightforward task since the gamma PDF is a continuous function while the PMF $f_H(h)$ is discrete function. Therefore, subsets of gamma PDF are fit to the PMF $f_H(h)$. The subsets of gamma PDF can be obtained by integrating the gamma PDF between the integer values of x as illustrated in FIG. 2. Integrating the gamma PDF between 0 and 1 provides the PMF value for h=0, integrating the gamma PDF between 1 and 2 provides the PMF value for h=1, and so on. This process can be mathematically described as, $$f_H^g(h;\alpha,\beta) = \int_h^{h+1} f^g(x,\alpha,\beta)dx, \text{ for } h \in \{0,1,2,\ldots\}, \quad (3)$$

where, $f_H^g(h)$ is an approximation to the PMF $f_H(h)$. Substituting Equation (2) into Equation (3) yields, $$f_H^g(h) = \int_h^{h+1} \frac{\beta^\alpha}{\Gamma(\alpha)} x^{\alpha-1} e^{-\beta x} dx, \text{ for } h \in \{0, 1, 2, \ldots\}, \quad (4)$$

$$= \frac{\beta^\alpha}{\Gamma(\alpha)} \int_h^{h+1} x^{\alpha-1} e^{-\beta x} dx.$$

With change of variable $x=t/\beta$ and $dx=dt/\beta$, Equation (4) can be rewritten in its equivalent form as, $$f_H^g(h) = \frac{\beta^\alpha}{\Gamma(\alpha)} \int_{\beta h}^{\beta(h+1)} \left(\frac{t}{\beta}\right)^{\alpha-1} e^{-t} \frac{dt}{\beta}, \quad (5)$$

$$= \frac{1}{\Gamma(\alpha)} \int_{\beta h}^{\beta(h+1)} t^{\alpha-1} e^{-t} dt,$$

$$= \frac{\Gamma(\alpha, \beta h, \beta(h+1))}{\Gamma(\alpha)},$$

where, $\Gamma(\alpha,\beta h, \beta(h+1)) = \int_{\beta h}^{\beta(h+1)} t^{\alpha-1} e^{-t} dt$ is the generalized incomplete gamma function. However, for the approximation in Equation (5) to be accurate, the values for $\alpha$ and $\beta$ parameters should be chosen such that it minimizes the mean squared error (MSE) between $f_H(h)$ and $f_H^g(h)$.

To approximate the $\alpha$ and $\beta$ parameters for gamma distribution, a histogram of H was obtained through extensive simulations in Matlab (a mathematical software program) with a range of values for SBS density $\lambda$, device velocity $v$, and handover count measurement period T, as shown in Table I. For each combination of $\lambda$, $v$ and T, one million samples of random variable H were used for constructing the PMF $f_H(h)$. The curve fitting tool in Matlab was used to obtain the values for $\alpha$ and $\beta$ parameters that provided the best fit of $f_H^g(h)$ to the PMF $f_H(h)$. Interpreting the characteristics of $\alpha$ and $\beta$ parameters with respect to $\lambda$, $v$, and T yields the following approximate closed form expressions for the $\alpha$ and $\beta$ parameters:

$$\alpha \approx 2.7 + 4vT\sqrt{\lambda}. \quad (6)$$

$$\beta \approx \pi + \frac{0.8}{0.38 + vT\sqrt{\lambda}}. \quad (7)$$

TABLE I

RANGE OF INPUT PARAMETERS.

| Parameter | Values |
|---|---|
| $\lambda$ | {1000, 1100, 1200, ..., 10000} SBSs/km² |
| v | {10, 30, 60, 120} km/h |
| T | 12 s |

Approximation of the PMF $f_H(h)$ Using Normal Distribution

Another embodiment approximates the PMF $f_H(h)$ for use in a CRLB using normal distribution. While gamma distribution resulted in an expression in integral form, normal distribution results in a closed form expression.

The PDF of normal distribution can be expressed as a function of mean $\mu$ and variance $\sigma^2$ as, $$f^n(x; \mu, \sigma^2) = \frac{1}{\sqrt{2\pi\sigma^2}} e^{-\frac{(x-\mu)^2}{2\sigma^2}}. \quad (8)$$

Since the PMF $f_H(h)$ is discrete and the normal distribution in Equation (8) is continuous, only non-negative integer samples of the normal distribution need be considered for the fitting process. Henceforth, the approximation to $f_H(h)$ can be expressed as, $$f_H^n(h) = \frac{1}{\sqrt{2\pi\sigma^2}} e^{-\frac{(h-\mu)^2}{2\sigma^2}}, \text{ for } h \in \{0, 1, 2, \ldots\}. \quad (9)$$

Here, the expression for mean $\mu$ can be readily obtained using Equation (1), $$\mu = \frac{4vT\sqrt{\lambda}}{\pi}. \quad (10)$$

The value of $\sigma^2$ should be chosen such that it minimizes the MSE between $f_H(h)$ and $f_H^n(h)$.

To obtain an approximation of the $\sigma^2$ parameter of normal distribution, the curve fitting tool in Matlab was used to obtain the value $\sigma^2$ that provided best fitting of $f_H^n(h)$ to the PMF $f_H(h)$. Interpreting the characteristics of $\sigma^2$ parameter with respect to $\lambda$, $v$, and T yields the following approximate closed form expression to be used in the PDF of normal distribution:

$$\sigma^2 \approx 0.07 + 0.41 vT\sqrt{\lambda}. \quad (11)$$

Cramer-Rao Lower Bound for Velocity Estimation

Depending on the embodiment, derivation of the CRLB for velocity estimation may be performed in accordance with the manner of approximation of the PMF.

When the PMF approximation is derived from a gamma distribution $f_H^g(h)$, in some embodiments the CRLB may be derived by obtaining the log-likelihood function, by taking the logarithm of the PMF, and then by differentiating the log-likelihood function with respect to $v$.

Returning to the PMF approximation using a gamma distribution in Equation (5), $$f_H^g(h; v) = \frac{\Gamma(\alpha, \beta h, \beta(h+1))}{\Gamma(\alpha)}, \quad (12)$$

where the $\alpha$ and $\beta$ parameters are approximated as, $$\alpha = 2.7 + 4vT\sqrt{\lambda}, \quad (13)$$

$$\beta = \pi + \frac{0.8}{0.38 + vT\sqrt{\lambda}}. \quad (14)$$

The log-likelihood function may be derived by taking the logarithm of Equation (12), as follows:

$$\log f_H^h(h;v) = \log \Gamma(\alpha,\beta h,\beta(h+1)) - \log \Gamma(\alpha). \quad (15)$$

Next, the log-likelihood function can be differentiated with respect to v as:

$$\frac{\partial}{\partial v}\log f_H^g(h; v) = \frac{\partial}{\partial v}\log\Gamma(\alpha, \beta h, \beta(h+1)) - \frac{\partial}{\partial v}\log\Gamma(\alpha). \quad (16)$$

After some tedious but straight forward derivation, the following expression for Equation (16) can be obtained:

$$\frac{\partial}{\partial v}\log f_H^g(h; v) = \quad (17)$$

$$\frac{4T\sqrt{\lambda}\,\beta^\alpha}{\alpha^2\Gamma(\alpha, \beta h, \beta(h+1))}[h_2^\alpha F_2(\alpha, \alpha; \alpha+1, \alpha+1; -\beta h) - (h+1)_2^\alpha$$

$$F_2(\alpha, \alpha; \alpha+1, \alpha+1; -\beta(h+1))] - \frac{4T\sqrt{\lambda}}{\Gamma(\alpha, \beta h, \beta(h+1))}$$

$$[\gamma(\alpha, \beta h)\log(\beta h) - \gamma(\alpha, \beta(h+1))\log(\beta(h+1))] +$$

$$\frac{0.8T\sqrt{\lambda}\,\beta^{\alpha-1}e^{-\beta h}[h^\alpha - e^{-\beta}(h+1)^\alpha]}{\Gamma(\alpha, \beta h, \beta(h+1))(0.38 + vT\sqrt{\lambda})^2} - 4T\sqrt{\lambda}\,\psi(\alpha),$$

where, $\gamma(\alpha, x) = \int_0^x t^{\alpha-1}t^{-1}dt$ is the lower incomplete gamma function, and $_2F_2(a_1, a_2; b_1, b_2; z)$ is generalized hypergeometric function which can be expressed as, $$_2F_2(a_1, a_2; b_1, b_2; z) = \sum_{k=0}^\infty \frac{(a_1)_k(a_2)_k}{(b_1)_k(b_2)_k}\frac{z^k}{k!}, \quad (18)$$

where, $(a)_0 = 1$ and $(a)_k = a(a+1)(a+2)\ldots(a+k-1)$, for $k \geq 1$. The CRLB for velocity estimation $\hat{v}$ can be expressed as, $$\text{var}(\hat{v}) \geq \frac{1}{\mathbb{E}\left[\left(\frac{\partial \log f_H^g(H; v)}{\partial v}\right)^2\right]}. \quad (19)$$

However, due to the complexity of the expression in Equation (17), it is impractical to derive the right hand side (RHS) of Equation (19) in closed form. For this reason, asymptotic CRLB can only be found by numerically evaluating the RHS of Equation (19). Through simulations, N samples of the random variable H are generated and denoted as $\{H_n\}$, for $n \in 1, 2, \ldots, N$. Using these N samples, it is possible to numerically evaluate the asymptotic CRLB using, $$\text{var}(\hat{v}) \geq \frac{N}{\Sigma_{n=1}^N\left(\frac{\partial \log f_H^g(H_n; v)}{\partial v}\right)^2}. \quad (20)$$

The number of samples N is typically huge (in the order of millions), and hence evaluating Equation (20) is computationally expensive. Therefore, an alternate form of averaging is used to evaluate the asymptotic CRLB which is computationally efficient:

$$\text{var}(\hat{v}) \geq \frac{N}{\Sigma_{m=H_{min}}^{H_{max}}\left(N_m\left(\frac{\partial \log f_H^g(m; v)}{\partial v}\right)^2\right)}, \quad (21)$$

where, $H_{max} = \max\{H_n\}$, $\forall n \in 1, 2, \ldots, N$, is the maximum value of $H_n$, $H_{min} = \{H_n\}$, $\forall n \in 1, 2, \ldots, N$, is the minimum value of $H_n$, and $N_m = \Sigma_{n=1}^N 1\{H_n = m\}$ is the number of elements in the set $\{H_n\}$ that are equal to m.

When the PMF approximation is derived from a normal distribution $f_H''(h)$, the CRLB may be derived in some embodiments using Fisher information for a general Gaussian distribution. The PMF approximation $f_H''(h)$ in Equation (9) can be represented as a general Gaussian distribution $$H \sim N(\mu, \sigma^2). \quad (22)$$

where, $$\mu = \frac{4vT\sqrt{\lambda}}{\pi}, \quad (23)$$

$$\sigma^2 = 0.07 + 0.41vT\sqrt{\lambda}. \quad (24)$$

The Fisher information for the general Gaussian observations is given by Kay (*Fundamentals of Statistical Signal Processing: Estimation Theory*. Prentice-Hall, Inc., 1993, Section 3.9; which is incorporated herein by reference):

$$I(v) = \left(\frac{\partial \mu}{\partial v}\right)^2 \frac{1}{\sigma^2} + \frac{1}{2(\sigma^2)^2}\left(\frac{\partial \sigma^2}{\partial v}\right)^2, \quad (25)$$

$$= \left(\frac{4T\sqrt{\lambda}}{\pi}\right)^2 \frac{1}{0.07 + 0.41vT\sqrt{\lambda}} +$$

$$\frac{1}{2(0.07 + 0.41vT\sqrt{\lambda})^2}(0.41T\sqrt{\lambda})^2,$$

$$= \frac{(4T\sqrt{\lambda})^2}{\pi^2(0.07 + 0.41vT\sqrt{\lambda})} + \frac{1}{2}\left(\frac{0.41T\sqrt{\lambda}}{0.07 + 0.41vT\sqrt{\lambda}}\right)^2.$$

Therefore, the CRLB can be derived using the Fisher information as, $$\text{var}(v) \geq \frac{1}{I(v)}, \quad (26)$$

$$\geq \frac{1}{\frac{1}{2}\left(\frac{0.41T\sqrt{\lambda}}{0.07 + 0.41vT\sqrt{\lambda}}\right)^2 + \frac{(4T\sqrt{\lambda})^2}{\pi^2(0.07 + 0.41vT\sqrt{\lambda})}},$$

$$\geq \frac{1}{\frac{1}{2}\left(\frac{0.41T\sqrt{\lambda}}{\sigma^2}\right)^2 + \left(\frac{\mu}{v\sigma}\right)^2}.$$

A Minimum Variance Unbiased (MVU) Velocity Estimator Based on Handover Counts

Some embodiments include a minimum variance unbiased (MVU) velocity estimator based on handover counts. Certain embodiments include an MVU velocity estimator derived from the CRLB for velocity estimation, which is in turn derived from an approximation of a PMF of handover counts. The MVU velocity estimator may receive the number of handovers (or handover count) $\hat{H}$ as an input and provide an estimate of device velocity $\hat{v}$.

Previously, two CRLB expressions were derived by considering gamma and Gaussian distributions, respectively, for approximating the handover count PMF. The CRLB expression derived from a gamma distribution was complicated and not in closed form. However, for the Gaussian distribution, the CRLB expression was relatively simple and in closed form. In some embodiments, a Gaussian distribution will be used and derive an estimator $\hat{v}$ for a device's velocity, which takes the number of handovers H as the input. The mean and the variance of this estimator will be further derived to show that it is a MVU estimator.

To derive the MVU velocity estimator, the Neyman-Fisher factorization can be used to find the sufficient statistic for v [21, Section 5.4]. Then, the Rao-Blackwell-Lehmann-Scheffe (RBLS) theorem can be used to find the MVUE [21, Section 5.5]. The Neyman-Fisher factorization theorem states that, if the PMF $f_H{}^n(h)$ can be factored as:

$$f_H^n(h) = g\mathcal{F}(h),v)r(h), \quad (27)$$

where g is a function depending on h only through F(h) and r is a function depending only on h, then F(h) is a sufficient statistic for v. Using Equation (9) and letting F(h)=h, PMF f MO can be factored in the form of Equation (27) as:

$$f_H^n(h) = \underbrace{\frac{1}{\sqrt{2\pi\sigma^2}} e^{-\frac{(\mathcal{F}(h)-a)^2}{2\sigma^2}}}_{g(\mathcal{F}(h),v)} \cdot \underbrace{\frac{1}{r(h)}}_{r(h)}, \quad (28)$$

Therefore, the sufficient statistic for v is F(h)=h. The sufficient statistic can be used to find the MVU estimator by determining a function s so that $\hat{v}=s(F)$ is an unbiased estimator of v. By inspecting the relationship between the mean number of handovers $\bar{H}$ and the velocity v in Equation (1), an estimator for v can be formulated as:

$$\hat{v} = \frac{\pi H}{4T\sqrt{\lambda}}. \quad (29)$$

In order to evaluate whether this estimator is unbiased, the expectation of the above estimator can be derived as:

$$E[\hat{v}] = E\left[\frac{\pi H}{4T\sqrt{\lambda}}\right] = \frac{\pi}{4T\sqrt{\lambda}} E[H] = \frac{\pi}{4T\sqrt{\lambda}} \mu. \quad (30)$$

Plugging Equation (10) into Equation (30), yields $$E[\hat{v}] = \frac{\pi}{4T\sqrt{\lambda}} \frac{4vT\sqrt{\lambda}}{\pi} = v. \quad (31)$$

Therefore, the estimator $\hat{v}$ expressed in (29) is unbiased. Since this estimator is derived through the RBLS theorem, it is a MVU estimator. To determine whether it is an efficient estimator, the variance of the MVU estimator is derived as follows:

$$\text{var}(\hat{v}) = \text{var}\left(\frac{\pi H}{4T\sqrt{\lambda}}\right) = \left(\frac{\pi}{4T\sqrt{\lambda}}\right)^2 \text{var}(H) = \left(\frac{v\sigma}{\mu}\right)^2. \quad (32)$$

Comparing Equation (32) with Equation (26) shows that the variance of the MVU estimator is greater than the CRLB, and hence, the derived estimator is not an efficient estimator. However, numerical results show that the variance of the MVU estimator is very close to the CRLB.

In some embodiments, the sojourn time is used for determining the velocity of the device in the wireless network. "Sojourn time" is defined as the duration that the device stays within the coverage of a particular base station cell. Embodiments using techniques involving sojourn time can include receiving a vector T of N sojourn time samples, each of which denotes the duration the user device remains in a zone of a particular base station; and determining a specific velocity estimate for the user device using T and a base station density ($\lambda$) as inputs to a velocity estimator. In some embodiments, the velocity estimator may achieve a CRLB for velocity estimation that was derived from a joint probability density function of the sojourn time samples.

In certain embodiments, the boundaries of a macro base station cell containing a plurality of smaller base stations can be represented or obtained by a Poisson-Voronoi tessellation. The base station locations are distributed according to Poisson point process (PPP) of a given intensity. The sojourn time probability density function (PDF) of the distance traveled in an arbitrary Poisson-Voronoi cell is given by $$f_L(l) = \int_0^\pi \int_0^{\pi-\alpha} \frac{\pi^2 \lambda l^2 \rho_\alpha \rho_\beta (2\pi\lambda l^2 b_0^2 \rho_\alpha^2 - c_0)}{\sin(\alpha+\beta)} \times e^{-\pi\lambda l^2 V_2(\alpha,\beta)} d\beta d\alpha. \quad (33)$$

where $$V_2(\alpha, \beta) =$$

$$(1 + \rho_\beta^2 - 2\rho_\beta \cos\alpha)\left(1 - \frac{\beta}{\pi} + \frac{\sin 2\beta}{2\pi}\right) + \rho_\beta^2\left(1 - \frac{\alpha}{\pi} + \frac{\sin 2\alpha}{2\pi}\right),$$

$$\rho_\alpha = \frac{\sin\alpha}{\sin(\alpha+\beta)}, \rho_\beta = \frac{\sin\beta}{\sin(\alpha+\beta)}, b_0 = \frac{(\pi-\beta)\cos\beta + \sin\beta}{\pi},$$

$$\text{and } c_0 = \frac{(\pi-\beta) + \sin\beta\cos\beta}{\pi}.$$

The expression in Equation (33) is actually the PDF of chord length distribution which is derived in Muche (Contact and chord length distribution functions of the poisson-voronoi tessellation in high dimensions, *Advances in Applied Probability*, vol. 42, no. 1, pp. 48-68, March 2010; which is incorporated herein by reference). The sojourn time PDF expression may be simplified by assuming a straight line mobility model in which the device travels in a straight line trajectory with a constant velocity.

In an embodiment with a Poisson-Voronoi tessellation formed by the SBSs distributed according to a PPP of intensity $\lambda$, a device traveling along a straight line trajectory with constant velocity v has a sojourn time PDF which can be expressed as, $$f_T(t;v) = v f_L(vt), \quad (34)$$

where the function $f_L(\bullet)$ is the chord length PDF given in Equation (33).

To prove this relationship, consider that since the sojourn time is the ratio of distance traveled by the device in a cell to the velocity of the UE, T=L/v, sojourn time distribution can be expressed as, $$F_T(t; v) = P(T \le t; v) = P\left(\frac{L}{v} \le t\right) = F_L(vt).$$

Figure 7:
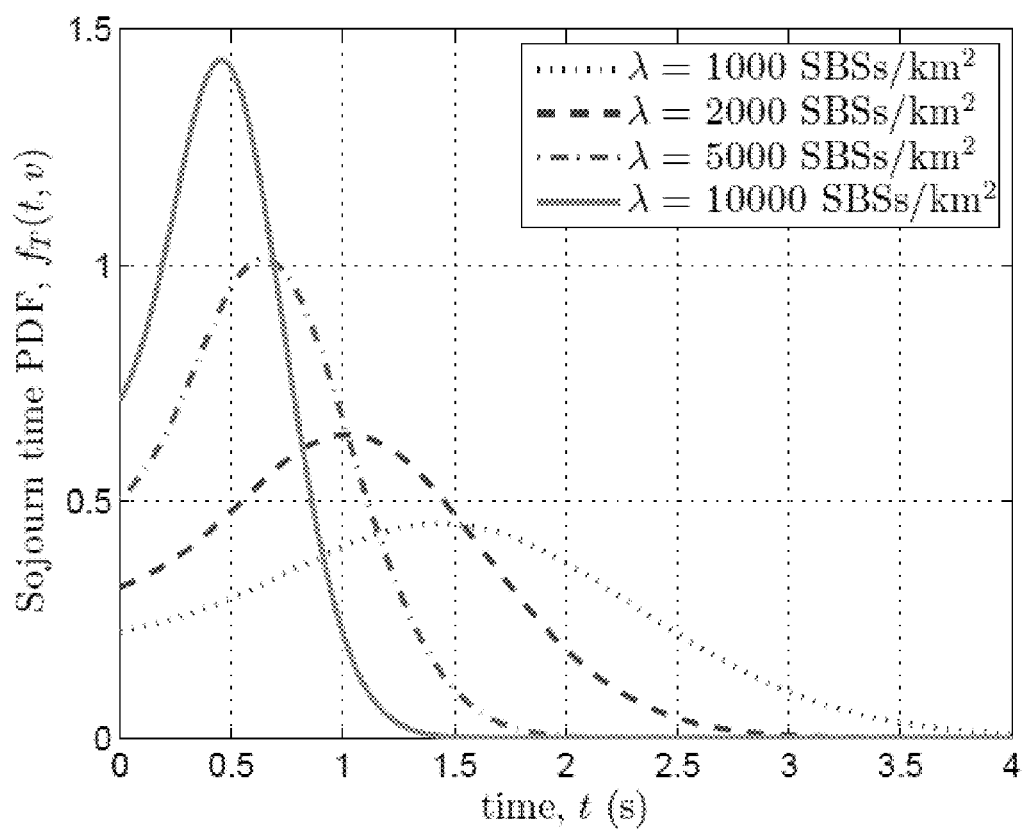
FIG. 7 shows plots of sojourn time PDF for different base station densities.

By differentiating the sojourn time distribution with respect to t, the sojourn time PDF can be represented as, $$f_T(t; v) = \frac{\partial F_T(t; v)}{\partial t} = \frac{\partial F_L(vt)}{\partial t} = v f_L(vt). \quad (5)$$

proving the relationship of Equation (34). The plots of sojourn time PDF for different SBS densities are shown in FIG. 7.

Having derived a model of the sojourn time PDF for a cell, the CRLB for velocity estimation can be derived using N sojourn time samples. In some embodiments, initially an expression for the joint PDF (JPDF) of the N sojourn time samples is obtained, and then this JPDF is used to derive the CRLB for velocity estimation.

To derive the JPDF, Let $T=\{T_n:n=0, 1, \ldots, N-1\}$ denote a vector of N sojourn time samples. When the Poisson-Voronoi tessellation formed by the SBSs is stationary and isotropic, the sojourn time samples are independent and identically distributed. Therefore, the JPDF of the sojourn time samples can be expressed as, $$f_T(t; v) = \prod_{n=0}^{N-1} f_T(t_n; v), \text{ for } t = \{t_n: n = 0, 1, \ldots, N-1\}, \quad (35)$$

$$= v^N \prod_{n=0}^{N-1} f_L(vt_n)$$

$$= v^N \prod_{n=0}^{N-1} f_L(l_n),$$

where $l_n = v t_n$ is the chord length corresponding to the nth sojourn time sample. A prerequisite for the CRLB derivation is that the JPDF must satisfy the regularity condition which will be shown in Lemma 1 (proof of which is derived in the Appendix section below), that the JPDF of sojourn time samples which is shown in Equation (35) satisfies the following regularity condition:

$$E\left[\frac{\partial \log f_T(t; v)}{\partial v}\right] = 0 \text{ for all } v,$$

where, $E[\cdot\cdot]$ denotes the expectation operator.

Since the JPDF of sojourn time samples satisfies the regularity condition, the CRLB for velocity estimation $\hat{v}$ can be obtained using, $$\text{var}(\hat{v}) \geq \frac{1}{E\left[\left(\frac{\partial \log f_T(t; v)}{\partial v}\right)^2\right]}. \quad (36)$$

Therefore, the CRLB for velocity estimation using N sojourn time samples can be expressed as, $$\text{var}(\hat{v}) \geq \frac{v^2}{4.38 N}. \quad (37)$$

Proof of the CRLB derivation in Equation (37) is shown in the Appendix section below.

Velocity Estimator Based on Sojourn Time

Certain embodiments include a velocity estimator that achieves the CRLB for velocity estimation using N sojourn time samples, the CRLB being derived from a JPDF of sojourn time. The velocity estimator based on sojourn time receives N sojourn time samples as the input and estimates the device velocity, given the base station density $\lambda$. In some cases, the base station density $\lambda$ may be received or updated periodically from the wireless network.

A velocity estimator based on sojourn time may be derived initially using an expression of mean sojourn time:

$$E[T] = E\left[\frac{L}{v}\right] = \frac{E[L]}{v} = \frac{\pi}{4v\sqrt{\lambda}}. \quad (38)$$

The equivalence in Equation (38) can be obtained from the expression for mean cross-sectional length, which is derived in Moller. Arranging the terms in Equation (6) and using $$E[T] = 1/N \Sigma_{n=0}^{N-1} T_n,$$

a velocity estimator expressed as Equation (38) can be derived:

$$\hat{v} = \frac{\pi N}{4\sqrt{\lambda} \sum_{n=0}^{N-1} T_n}. \quad (39)$$

An estimator is said to be unbiased if its expected value is same as the true value of the parameter being estimated. The expectation of the above estimator, Equation (39), can be derived as, $$E[\hat{v}] = \frac{\pi N}{4\sqrt{\lambda}} E\left[\frac{1}{\sum_{n=0}^{N-1} T_n}\right] \neq v. \quad (40)$$

Therefore, this is not an unbiased estimator. However, as N tends to infinity, the estimator in Equation (39) becomes asymptotically unbiased, as in Equation (41):

$$\lim_{N \to \infty} E[\hat{v}] = \frac{\pi}{4\sqrt{\lambda}} E\left[\frac{1}{\lim_{N \to \infty} \frac{1}{N} \sum_{n=0}^{N-1} T_n}\right], \quad (41)$$

$$= \frac{\pi}{4\sqrt{\lambda}} E\left[\frac{1}{E[T_n]}\right]$$

$$= \frac{\pi}{4\sqrt{\lambda}} E\left[\frac{4v\sqrt{\lambda}}{\pi}\right]$$

$$= v.$$

The variance of the velocity estimator can therefore be expressed as in Equation (42):

$$\text{var}(\hat{v}) = E[\hat{v}^2] - (E[\hat{v}])^2, \quad (42)$$

$$= \left(\frac{\pi N}{4\sqrt{\lambda}}\right)^2 E\left[\frac{1}{(\sum_{n=0}^{N-1} T_n)^2}\right] - \left(\frac{\pi N}{4\sqrt{\lambda}}\right)^2 \left(E\left[\frac{1}{\sum_{n=0}^{N-1} T_n}\right]\right)^2.$$

Figure 10:
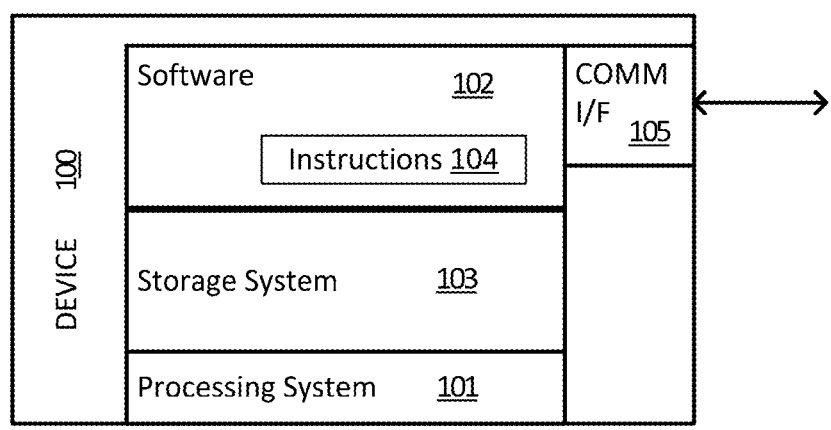
FIG. 10 shows a block diagram illustrating components of a computing device or system used in some implementations or embodiments.

FIG. 10 shows a block diagram illustrating components of a computing device or system used in some implementations or embodiments incorporating techniques for velocity determination as described herein. For example, any computing device or user equipment capable of determining a specific velocity estimate or having a component modifying a local function of the device may be implemented as described with respect to device 100, which can itself include one or more computing devices. The hardware can be configured according to any suitable computer architectures such as a Symmetric Multi-Processing (SMP) architecture or a Non-Uniform Memory Access (NUMA) architecture.

The device 100 can include a processing system 101, which may include a processing device such as a central processing unit (CPU) or microprocessor and other circuitry that retrieves and executes software 102 from storage system 103. Processing system 101 may be implemented within a single processing device but may also be distributed across multiple processing devices or sub-systems that cooperate in executing program instructions.

Examples of processing system 101 include general purpose central processing units, application specific processors, and logic devices, as well as any other type of processing device, combinations, or variations thereof. The one or more processing devices may include multiprocessors or multi-core processors and may operate according to one or more suitable instruction sets including, but not limited to, a Reduced Instruction Set Computing (RISC) instruction set, a Complex Instruction Set Computing (CISC) instruction set, or a combination thereof. In certain embodiments, one or more digital signal processors (DSPs) may be included as part of the computer hardware of the system in place of or in addition to a general purpose CPU.

Storage system 103 may comprise any computer readable storage media readable by processing system 101 and capable of storing software 102 including, e.g., processing instructions for determining a specific device velocity. Storage system 103 may include volatile and nonvolatile, removable and non-removable media implemented in any method or technology for storage of information, such as computer readable instructions, data structures, program modules, or other data.

Examples of storage media include random access memory (RAM), read only memory (ROM), magnetic disks, optical disks, CDs, DVDs, flash memory, solid state memory, phase change memory, or any other suitable storage media. Certain implementations may involve either or both virtual memory and non-virtual memory. In no case do storage media consist of a propagated signal. In addition to storage media, in some implementations, storage system 103 may also include communication media over which software 102 may be communicated internally or externally.

Storage system 103 may be implemented as a single storage device but may also be implemented across multiple storage devices or sub-systems co-located or distributed relative to each other. Storage system 103 may include additional elements, such as a controller, capable of communicating with processing system 101.

Software 102 may be implemented in program instructions and, among other functions, may, when executed by device 100 in general or processing system 101 in particular, direct device 100 or processing system 101 to operate as described herein for determining a specific device velocity. Software 102 may provide program instructions 104 that implement component for determining a specific device velocity. Software 102 may implement on device 100 components, programs, agents, or layers that implement in machine-readable processing instructions 104 the methods and techniques described herein.

Software 102 may also include additional processes, programs, or components, such as operating system software and other application software. For instance, other software might include other components or instructions that send a handover count or receive a velocity estimate and use the velocity estimate to adjust a local parameter of the device.

In general, software 102 may, when loaded into processing system 101 and executed, transform device 100 overall from a general-purpose computing system into a special-purpose computing system customized to determine a velocity estimate in accordance with the techniques herein. Indeed, encoding software 102 on storage system 103 may transform the physical structure of storage system 103. The specific transformation of the physical structure may depend on various factors in different implementations of this description. Examples of such factors may include, but are not limited to, the technology used to implement the storage media of storage system 103 and whether the computer-storage media are characterized as primary or secondary storage. Software 102 may also include firmware or some other form of machine-readable processing instructions executable by processing system 101.

Device 100 may represent any computing system on which software 102 may be staged and from where software 102 may be distributed, transported, downloaded, or otherwise provided to yet another computing system for deployment and execution, or yet additional distribution.

A communication interface 105 may be included, providing communication connections and devices that allow for communication between device 100 and other computing systems (not shown) over a communication network or collection of networks (not shown) or the air. Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned communication media, network, connections, and devices are well known and need not be discussed at length here.

It should be noted that many elements of device 100 may be included in a system-on-a-chip (SoC) device. These elements may include, but are not limited to, the processing system 101, a communications interface 105, and even elements of the storage system 103 and software 102.

Alternatively, or in addition, the functionality, methods and processes described herein can be implemented, at least in part, by one or more hardware modules (or logic components). For example, the hardware modules can include, but are not limited to, application-specific integrated circuit (ASIC) chips, field programmable gate arrays (FPGAs), system-on-a-chip (SoC) systems, complex programmable logic devices (CPLDs) and other programmable logic devices now known or later developed. When the hardware modules are activated, the hardware modules perform the functionality, methods and processes included within the hardware modules.

Following are examples that illustrate procedures for practicing certain disclosed techniques. Examples may also illustrate advantages of the disclosed techniques. These examples should not be construed as limiting.

Example 1

In an embodiment including a velocity estimator using handover counts, the accuracy of the velocity estimator can be validated by iterative computation with respect to the estimator's constituent derivations. Firstly, the accuracy of gamma PMF approximation $f_H^g(h)$ and normal PMF approximation $f_H^n(h)$ can be validated by plotting their MSE performances. Secondly, the CRLBs are plotted and analyzed in reference to their characteristics for the variations in SBS density $\lambda$, device velocity $v$, and handover count measurement interval T. Finally, the variance of the MVU velocity estimator using handover counts is plotted to show that its variance is approximately equal to the CRLB.

Figure 3A:
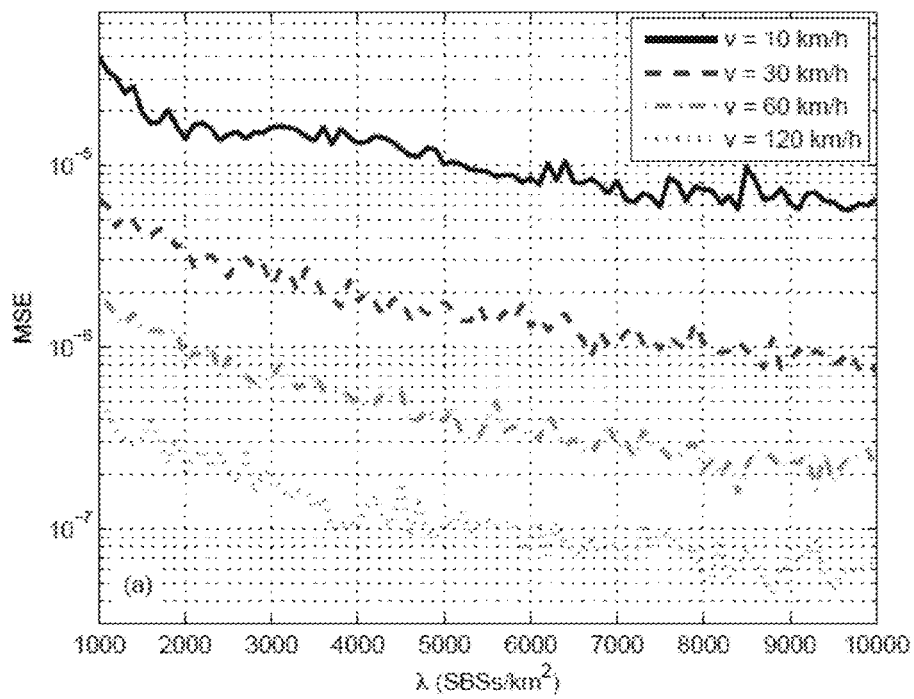
FIGS. 3A-3B show plots of the mean squared error for different device velocities and base station densities.
Figure 3B:
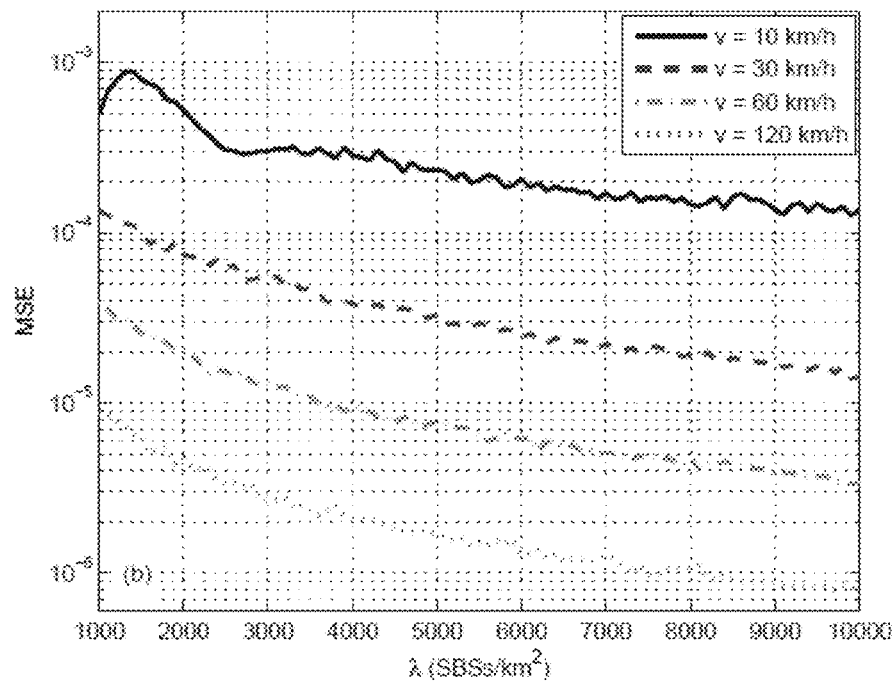

Embodiments described herein derived approximations to the PMF of the number of handovers using gamma distribution and normal distribution. The accuracy of each approximation method can be quantified by evaluating the MSE between the approximation and the PMF $f_H(h)$. The MSE can be expressed as, $$MSE = \frac{1}{N} \sum_{h=1}^{N} [h_H^u(h) - f_H(h)]^2, \text{ for } u \in \{g, n\}, \tag{43}$$

where N is the number of points in the PMF. The characteristics of the MSE with respect to the variations in $\lambda$ and $v$ are shown in FIG. 3A-3B for the two approximation methods. FIG. 3A shows the MSE versus $\lambda$ for different $v$ with a fixed time window T=12 sec. for a PMF approximation using gamma distribution. FIG. 3B shows the MSE versus $\lambda$ for different $v$ with a fixed time window T=12 sec. for a PMF approximation using normal distribution.

In general, the MSE of both approximation methods decreases with the increase in base station density $\lambda$ or device velocity $v$. Thus, higher SBS density and higher device velocity leads to better accuracy of the PMF approximation. Comparing FIG. 3A and FIG. 3B, it is evident that the approximation using gamma distribution provides approximately ten times smaller MSE than the approximation using normal distribution. However, the approximation using gamma distribution is not in closed form and hence it is more complicated than the approximation using normal distribution. Therefore, there exists a trade-off between accuracy and complexity in the two approximation methods. Either embodiment may be applicable depending on the desired trade-off of characteristics in a given implementation.

Figure 4A:
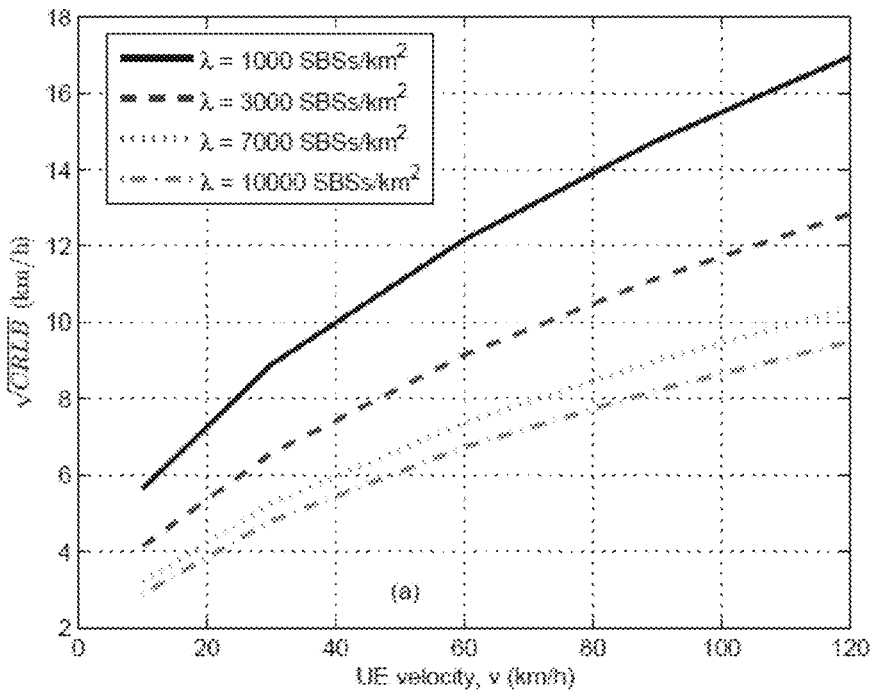
FIGS. 4A-4B show Cramer-Rao Lower Bound plots for the variations in base station density and device velocity estimate.
Figure 4B:
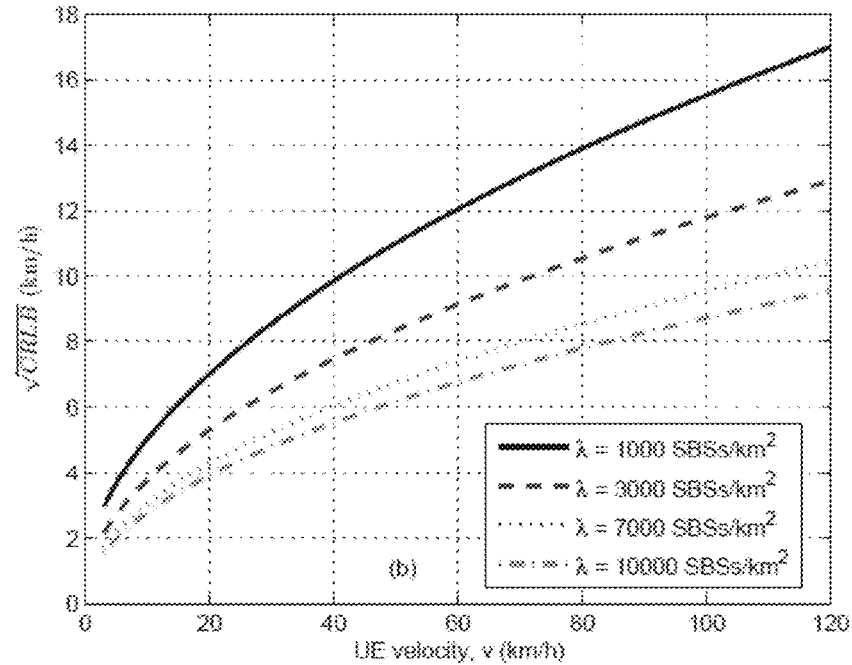

FIGS. 4A-4B show CRLB plots for the variations in base station density $\lambda$ and device velocity estimation $\hat{v}$ with respect to gamma and normal PMF approximations. In FIG. 4A, in the case of a gamma approximation of PMF $f_H(h)$, the CRLB plots are obtained by numerically evaluating the expression in Equation (21). The CRLB plots in FIG. 4B are obtained using the closed form expression in Equation (26) for the case of normal approximation of PMF $f_H(h)$. The CRLB plots in FIG. 4A and FIG. 4B are similar and follow the same trends with respect to $\lambda$ and $v$. However, it is expected that the plots in FIG. 4A are more accurate because of the smaller MSE of the gamma approximation method. Conversely, the closed form CRLB expression in Equation (26) for the case of normal approximation can provide insights such as the dependence of CRLB on different parameters.

From FIG. 4A-4B, it is evident that the CRLB increases with increasing UE velocity $v$. This is because the variance of the number of handovers H increases with increasing $v$, which can be observed in FIG. 1B. In contrast, the CRLB decreases with increasing base station density $\lambda$, which can also be intuitively understood from FIG. 1B. When $\lambda$=1000 SBSs/km², the peaks of the PMFs for different UE velocities are closely spaced with each other making it difficult to distinguish between the different UE velocities, resulting into higher CRLB. With $\lambda$=10000 SBSs/km², the peaks of the PMFs have more spacing between them making it easier to distinguish between the different UE velocities, resulting into lower CRLB.

Figure 5A:
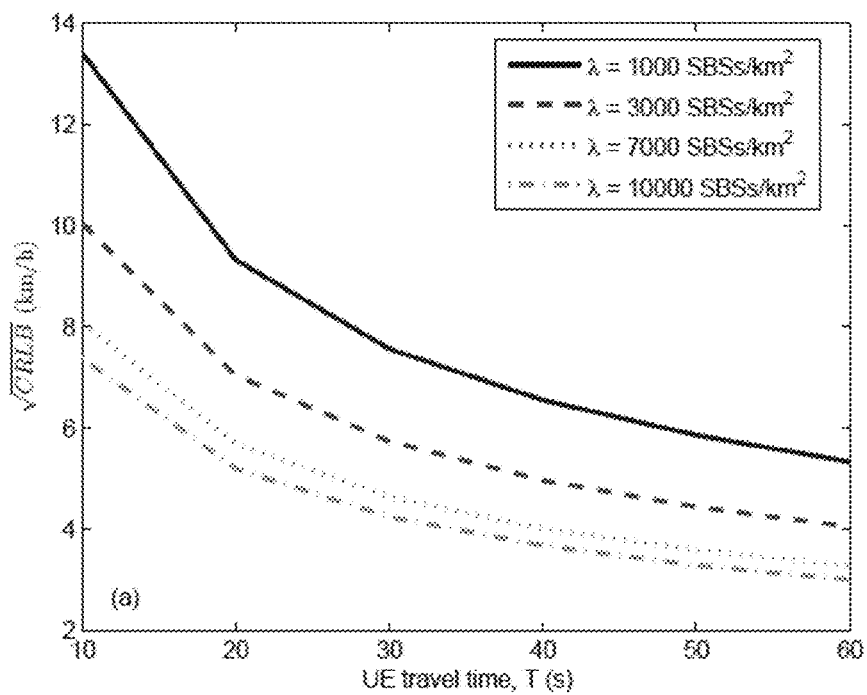
FIGS. 5A-5B show the Cramer-Rao Lower Bound plots with respect to time window (T) for several base station densities and a constant velocity.
Figure 5B:
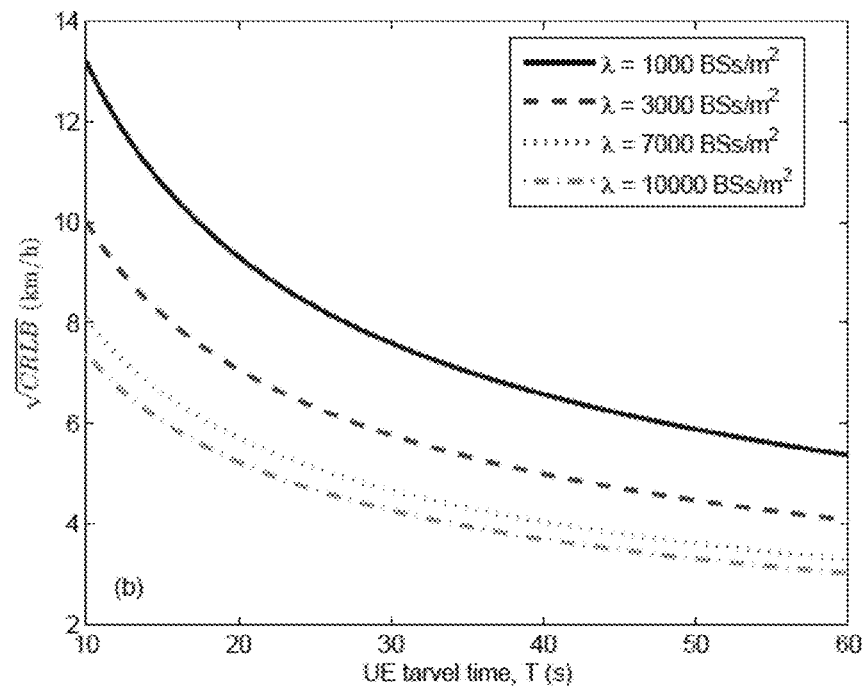

FIGS. 5A-5B show the CRLB plots with respect to time window (T) for several base station densities ($\lambda$) and a constant velocity of $v$=60 km/h. For a given UE velocity $v$ and SBS density $\lambda$, CRLB decreases as the observation time increases. Therefore, embodiments having a longer observation time may result in better accuracy of the velocity estimation.

Figure 6A:
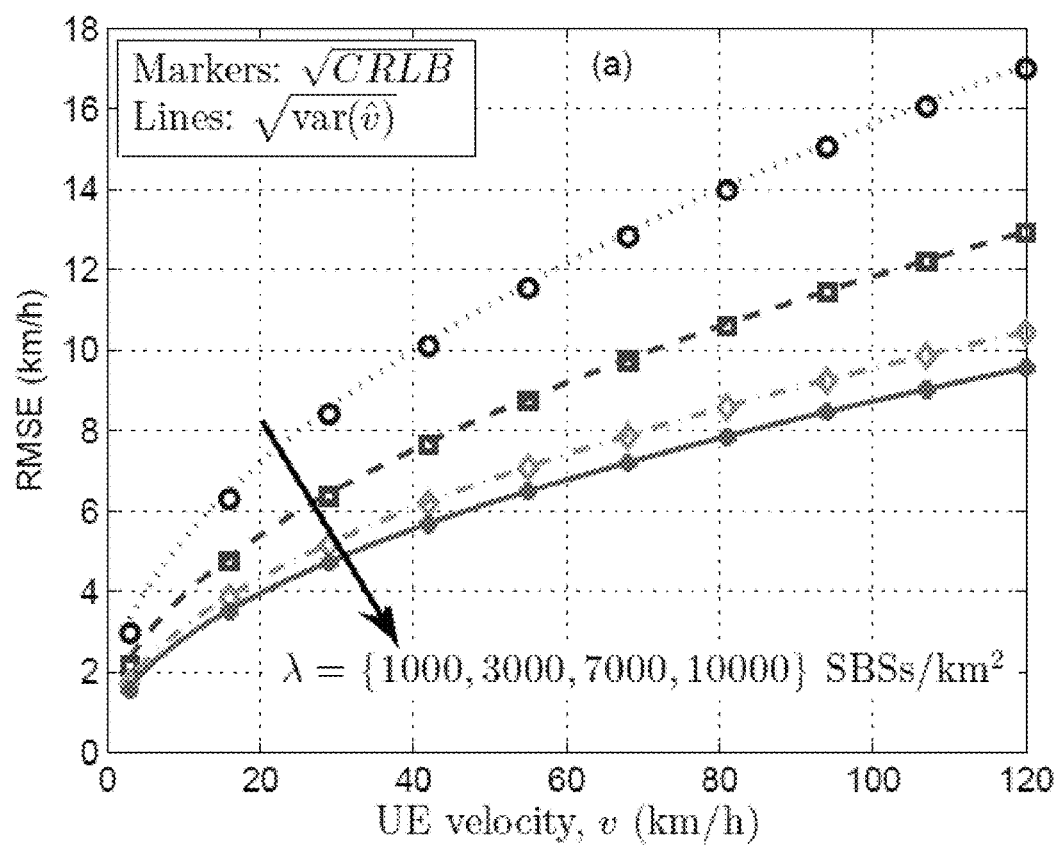
FIGS. 6A-6B show the comparison between the Cramer-Rao Lower Bound and the variance of minimum variance unbiased estimator derived in some embodiments.
Figure 6B:
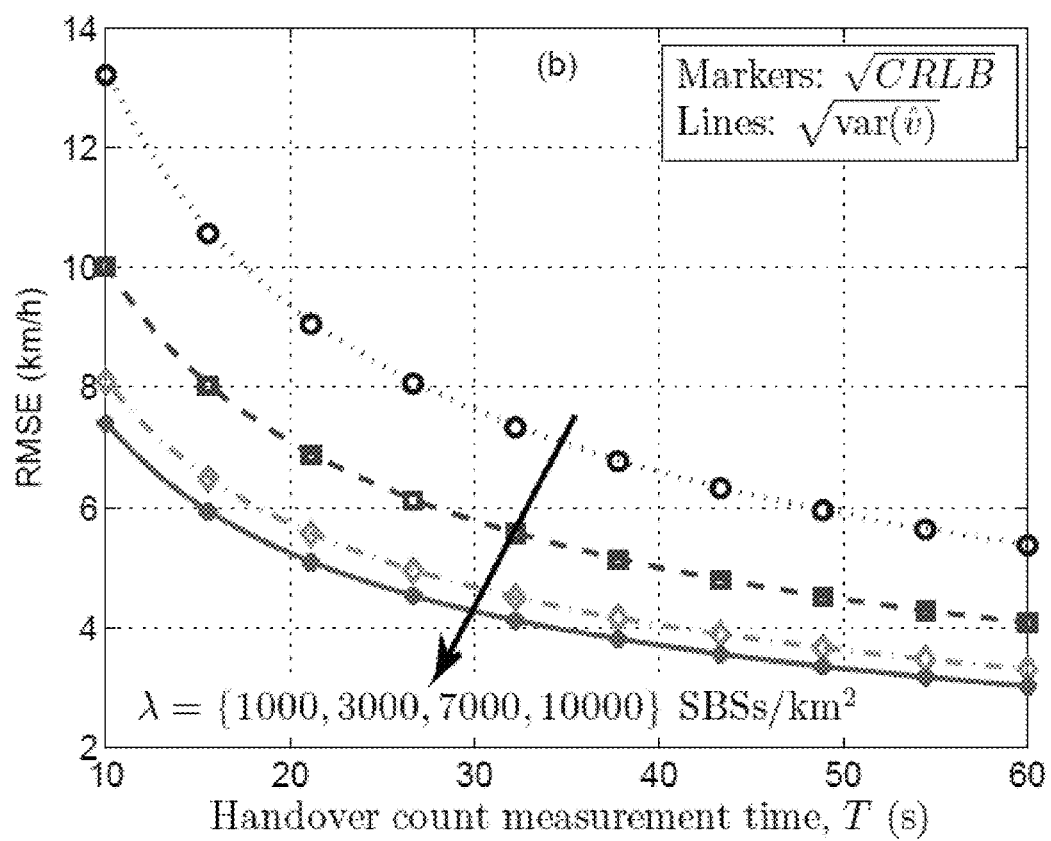

FIGS. 6A-6B show the comparison between the CRLB and the variance of the MVU estimator derived in some embodiments. FIG. 6A uses T=12 sec. and shows variations in $v$ and $\lambda$, and FIG. 6B uses $v$=60 km/h for variations in T and $\lambda$. The plots in both FIGS. 6A and 6B show that the variance of the estimator tightly matches with the CRLB.

Example 2

In an embodiment including a velocity estimator using sojourn time, the accuracy of the velocity estimator can be validated by iterative computation with respect to the estimator's constituent derivations.

Figure 8:
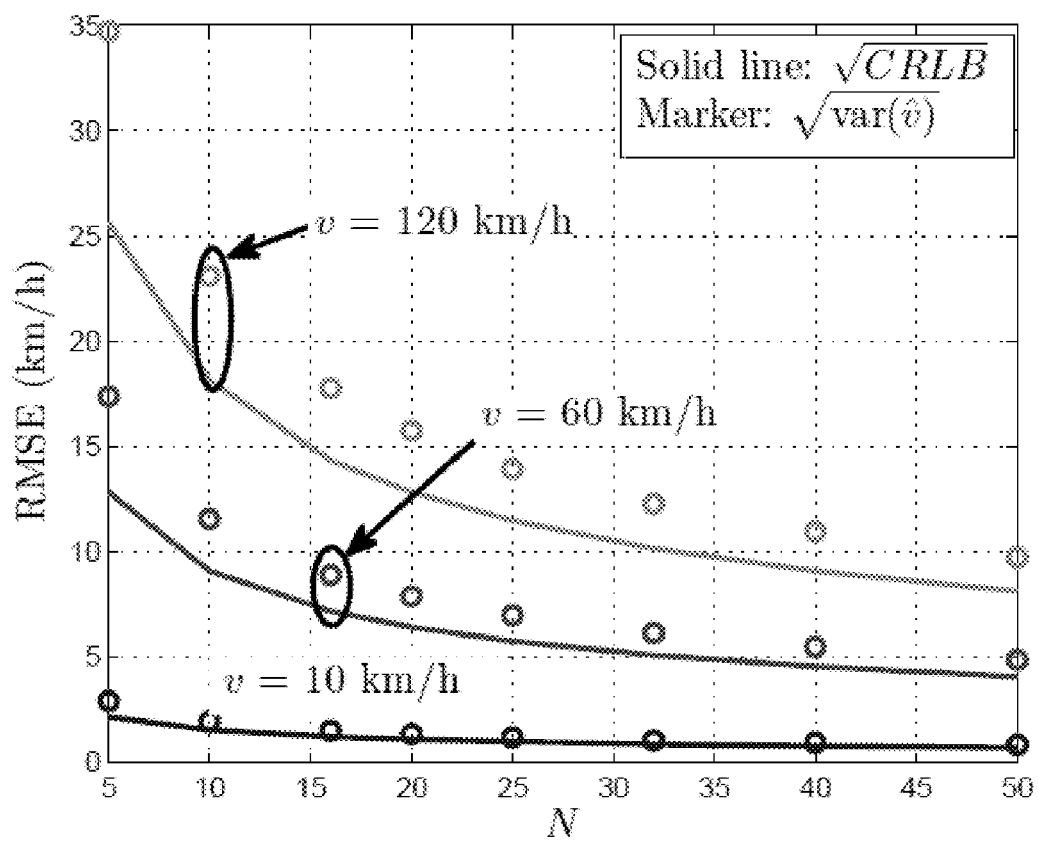
FIG. 8 shows plots of the Cramer-Rao Lower Bound and estimator variance for different N and v values.

FIG. 8 shows the plots of CRLB and estimator variance are shown for different N and $v$ values. The CRLB plots were obtained using Equation (37), while the plots of estimator variance were obtained through numerical computation of Equation (42). The plots show that the root mean squared error (RMSE) increases with the increasing UE velocity. On the other hand, the RMSE decreases as the number of sojourn time samples increases. Furthermore, as N increases, the difference between the CRLB and the estimator variance decreases.

Example 3

Some embodiments of the techniques include a velocity estimator which may combine sojourn time and handover count. As previously noted in Equation (26) and below, the CRLB for UE velocity estimation $\hat{v}_{ho}$ is derived to be, $$\text{var}(\hat{v}_{ho}) \geq \frac{1}{\frac{1}{2}\left(\frac{0.41T_w\sqrt{\lambda}}{\sigma^2}\right)^2 + \left(\frac{\mu}{v\sigma}\right)^2}, \tag{44}$$

Where, $T_w$ is the time window during which the number of handovers made by the UE is counted, and $$\mu = \frac{4vT_w\sqrt{\lambda}}{\pi}, \tag{45}$$

$$\sigma^2 = 0.07 + 0.41vT_w\sqrt{\lambda}. \tag{46}$$

Figure 9:
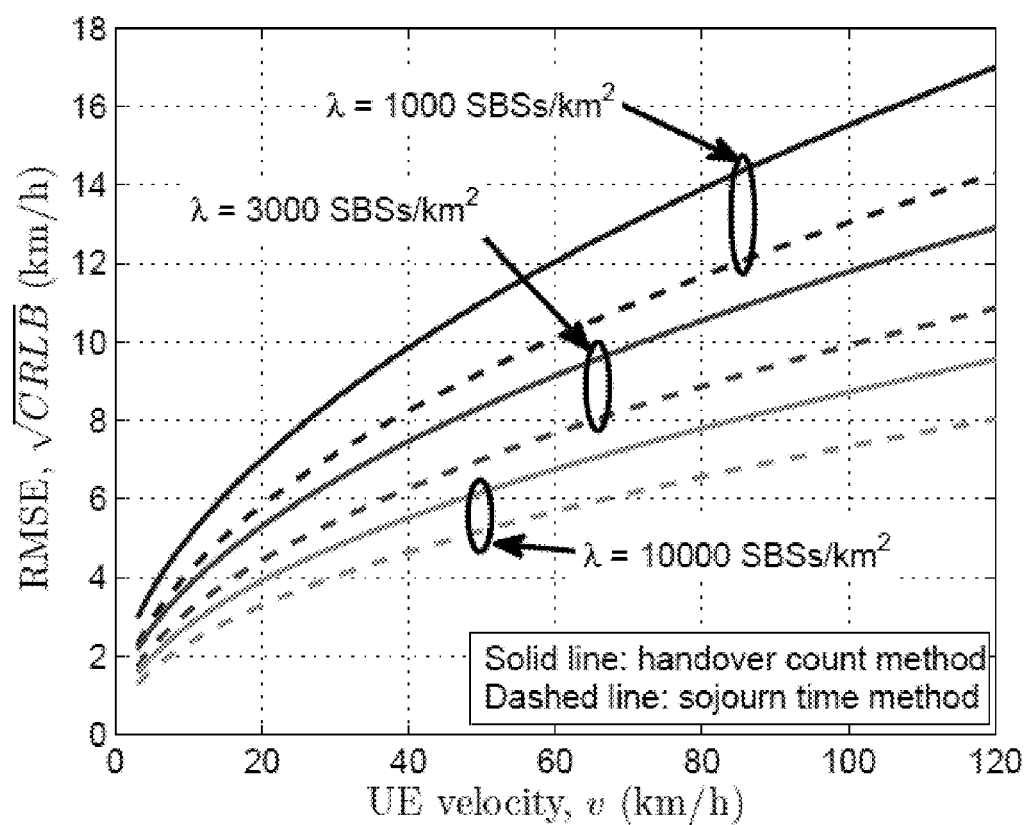
FIG. 9 shows plots comparing the root mean squared error of handover-count-based and sojourn-time-based-velocity estimation methods.

FIG. 9 shows plots comparing the RMSEs of handover-count-based and sojourn-time based-velocity estimation methods. To have a consistent comparison between the two methods, the observation time window is fixed to $T_w$=12 sec. in both instances. Thus, the number of sojourn time samples is a random variable which is equal to the number of handovers. Therefore, the number of sojourn time samples are equivalent to the mean number of handovers as, $$N = \frac{4vT_w\sqrt{\lambda}}{\pi}. \tag{47}$$

FIG. 9 also illustrates that the RMSE when using sojourn time is smaller than the RMSE when using handover count, for all UE velocities and for all SBS densities. This result is primarily because the handover count method estimates the UE velocity by Making use of only the handover count information, whereas the sojourn time method uses both handover count information and sojourn time information for the velocity estimation. Hence, the sojourn time method in this instance provides better accuracy for the UE velocity estimation.

APPENDIX

Lemma 1: Regularity Condition. Taking a natural logarithm of the JPDF in Equation (35) yields the log-likelihood function as, $$\log f_T(t; v) = N\log v + \sum_{n=0}^{N-1} \log f_L(l_n). \tag{48}$$

Taking the derivative of the log-likelihood function yields, $$\frac{\partial \log f_T(t; v)}{\partial v} = \frac{N}{v} + \sum_{n=0}^{N-1} \frac{t_n}{f_L(l_n)} \frac{\partial f_L(l_n)}{\partial r_n}. \tag{49}$$

The differential term in Equation (49) can be derived to be, $$\frac{\partial f_L(l_n)}{\partial r_n} = \frac{2}{r}(f_L(l_n) + f'_L(l_n)), \tag{50}$$

where, $$f'_L(l) = \int_0^\pi \int_0^{\pi-\alpha} \left( \frac{2\pi^3\lambda^2 l^4 \rho_\alpha^3 \rho_\beta b_0^2(1 - \pi\lambda l^2 V_2(\alpha, \beta))}{\sin(\alpha + \beta)} + \frac{\pi^3\lambda^2 l^4 \rho_\alpha \rho_\beta c_0 V_2(\alpha, \beta)}{\sin(\alpha + \beta)} \right) \times e^{-\pi\lambda l^2 V_2(\alpha, \beta)} d\beta d\alpha. \tag{51}$$

Substituting Equation (50) into Equation (49) yields, $$\frac{\partial \log f_T(t; v)}{\partial v} = \frac{1}{v}\left(3N + 2\sum_{n=0}^{N-1} \frac{f'_L(l_n)}{f_L(l_n)}\right). \tag{52}$$

To check whether the JPDF satisfies the regularity condition, take the expectation of Equation (52) as, $$E\left[\frac{\partial \log f_T(t; v)}{\partial v}\right] = \frac{1}{v}\left(3N + 2\sum_{n=0}^{N-1} E\left[\frac{f'_L(l_n)}{f_L(l_n)}\right]\right), \tag{53}$$

The expectation function in Equation (53) can be derived as follows:

$$E\left[\frac{f'_L(l_n)}{f_L(l_n)}\right] = \int_0^\infty \frac{f'_L(l)}{f_L(l)} f_L(l) dl = \int_0^\infty f'_L(l) dl = -1.5. \tag{54}$$

The last step in Equation (54) was obtained by numerically evaluating the integral $\int_0^\infty f'_L(l)dl$ in Matlab. Substituting Equation (54) into Equation (34) and simplifying yields, $$E\left[\frac{\partial \log f_T(t; v)}{\partial v}\right] = \frac{1}{v}[3N + 2(-1.5)N] = 0. \tag{55}$$

Therefore, it is proved that the JDPF in Equation (35) satisfies the regularity condition.

Proof of the CRLB Derivation:

Squaring Equation (52) and taking the expectation yields, $$E\left[\left(\frac{\partial \log f_T(t; v)}{\partial v}\right)^2\right] = \frac{1}{v^2}E\left[9N^2 + 4\left(\sum_{n=0}^{N-1} \frac{f'_L(l_n)}{f_L(l_n)}\right)^2 + 12N\sum_{n=0}^{N-1} \frac{f'_L(l_n)}{f_L(l_n)}\right], \tag{56}$$

$$= \frac{1}{v^2}E\left[9N^2 + 4\sum_{n=0}^{N-1}\left(\frac{f'_L(l_n)}{f_L(l_n)}\right)^2 + 8\sum_{m<n} \frac{f'_L(l_n)f'_L(l_m)}{f_L(l_n)f_L(l_m)} + 12N\sum_{n=0}^{N-1} \frac{f'_L(l_n)}{f_L(l_n)}\right],$$

$$= \frac{1}{v^2}\left(9N^2 + 4\sum_{n=0}^{N-1} E\left[\left(\frac{f'_L(l_n)}{f_L(l_n)}\right)^2\right] + 8\sum_{m<n} E\left[\frac{f'_L(l_n)f'_L(l_m)}{f_L(l_n)f_L(l_m)}\right] + 12N\sum_{n=0}^{N-1} E\left[\frac{f'_L(l_n)}{f_L(l_n)}\right]\right).$$

The first two expectation functions in Equation (56) can be derived as follows:

$$E\left[\left(\frac{f'_L(l_n)}{f_L(l_n)}\right)^2\right] = \int_0^\infty \left(\frac{f'_L(l)}{f_L(l)}\right)^2 f_L(l) dl, \tag{57}$$

$$= \int_0^\infty \frac{f'^2_L(l)}{f_L(l)} dl$$

$$= 3.345.$$

The last step in Equation (57) was obtained by numerically evaluating the integral in Matlab. Next, $$E\left[\frac{f'_L(l_n)f'_L(l_m)}{f_L(l_n)f_L(l_m)}\right] = \int\int_0^\infty \frac{f'_L(l_n)f'_L(l_m)}{f_L(l_n)f_L(l_m)} f_L(l_n)f_L(l_m) dl_n dl_m, \tag{58}$$

$$= \int\int_0^\infty f'_L(l_n)f'_L(l_m) dl_n dl_m,$$

$$= \int_0^\infty f'_L(l_m)\left(\int_0^\infty f'_L(l_n) dl_n\right) dl_m.$$

Substituting (54) into the above equation, we get, $$E\left[\frac{f'_L(l_n)f'_L(l_m)}{f_L(l_n)f_L(l_m)}\right] = -1.5\int_0^\infty f'_L(l_m)\,dl_m \qquad (59)$$
$$= -1.5(-1.5),$$
$$= 2.25.$$

Substituting (54), (57) and (58) into (56) yields:

$$E\left[\left(\frac{\partial \log f_T(t;v)}{\partial v}\right)^2\right] = \frac{1}{v^2}\left[9N^2 + 4(3.345)N + 8(2.25)\frac{N(N-1)}{2} + \qquad (60)\right.$$
$$\left. 12(-1.5)N^2\right],$$
$$= \frac{4.38N}{v^2}.$$

Substituting (58) into (36) obtains the CRLB as expressed in (37), completing the proof.

It should be understood that the examples and embodiments described herein are for illustrative purposes only and that various modifications or changes in light thereof will be suggested to persons skilled in the art and are to be included within the spirit and purview of this application.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

All patents, patent applications, provisional applications, and publications referred to or cited herein (including those in the "References" section) are incorporated by reference in their entirety, including all figures and tables, to the extent they are not inconsistent with the explicit teachings of this specification.

REFERENCES

[1] "Cisco Visual Networking Index: Global Mobile Data Traffic Forecast Update, 2013-2018 (White Paper)," Cisco Systems, February 2014.

[2] Qualcomm, "The 1000x mobile data challenge: More small cells, more spectrum, higher efficiency," November 2013.

[3] Samsung, "Mobility support to pico cells in the co-channel HetNet deployment," Stockholm, Sweden, March 2010, 3GPP Standard Contribution (R2-104017).

[4] D. L. Perez, I. Guvenc, and X. Chu, "Mobility management challenges in 3GPP heterogeneous networks," IEEE Commun. Mag., vol. 50, no. 12, pp. 70-78, December 2012.

[5] J. Puttonen, N. Kolehmainen, T. Henttonen, and J. Kaikkonen, "On idle mode mobility state detection in evloved UTRAN," in Proc. IEEE Int. Conf. Information Technology: New Generations, Las Vegas, Nev., April 2009, pp. 1195-1200.

[6] S. Barbera, P. Michaelsen, M. Saily, and K. Pedersen, "Improved mobility performance in LTE co-channel hetnets through speed differentiated enhancements," in Proc. IEEE Globecom Workshops (GC Wkshps), 2012, pp. 426-430.

[7] 3GPP, "Evolved universal terrestrial radio access (E-UTRA); radio resource control (RRC); protocol specification, (TS 36.331)."

[8] 3GPP TS 36.304, "User Equipment (UE) procedures in idle mode," 3GPP-TSG RAN, bb, Tech. Rep. 8.5.0, March 2009.

[9] M. Ishii and M. Iwamura, "User device and method in mobile communication system," European Patent No: 2187671 A1, May 2010. [Online]. Available: https://www.google.com/patents/EP2187671A1

[10] A. Sampath and J. Holtzman, "Estimation of maximum Doppler frequency for handoff decisions," in Proc. IEEE Vehicular Technology Conf. (VTC), Secaucus, N.J., May 1993, pp. 859-862.

[11] B. Zhou and S. Blostein, "Estimation of maximum Doppler frequency for handoff decisions," in Proc. Sixth Can. Workshop on Info. Theory, June 1999, pp. 111-114.

[12] L. Zhou and S. D. Blostein, "Recursive maximum likelihood estimation of maximum Doppler frequency of a sampled fading signal," in Proc. Biennial Sym. on Commun., 2000, pp. 361-365.

[13] S. Barbera, P. Michaelsen, M. Saily, and K. Pedersen, "Improved mobility performance in lte co-channel hetnets through speed differentiated enhancements," in IEEE Globecom Workshops (GC Wkshps), Anaheim, Calif., December 2012, pp. 426-430.

[14] X. Lin, R. Ganti, P. Fleming, and J. Andrews, "Towards understanding the fundamentals of mobility in cellular networks," IEEE Trans. Wireless Commun., vol. 12, no. 4, pp. 1686-1698, April 2013.

[15] W. Bao and B. Liang, "Handoff rate analysis in heterogeneous cellular networks: A stochastic geometric approach," in Proc. ACM Int. Conf. on Modeling, Analysis and Simulation of Wireless and Mobile Systems, Montreal, QC, Canada, September 2014, pp. 95-102.

[16] S. Sadr and R. Adve, "Handoff rate and coverage analysis in multi-tier heterogeneous networks," IEEE Trans. Wireless Commun., vol. PP, no. 99, pp. 1-1, January 2015.

[17] H. Ishii, Y. Kishiyama, and H. Takahashi, "A novel architecture for LTE-B: C-plane/U-plane split and phantom cell concept," in Proc. IEEE Global Telecommun. Conf. (GLOBECOM) Workshops, 2012, pp. 624-630.

[18] J. Moller, *Lectures On Random Voronoi Tessellations*. Springer-Verlag, 1994.

[19] M. Tanemura, "Statistical distributions of poisson voronoi cells in two and three dimensions," Forma, vol. 18, no. 4, pp. 221-247, 2003.

[20] J.-S. Ferenc and Z. Nda, "On the size distribution of poisson voronoi cells," Physica A: Statistical Mechanics and its Applications, vol. 385, no. 2, pp. 518-526, 2007.

[21] S. M. Kay, Fundamentals of Statistical Signal Processing: Estimation Theory. Prentice-Hall, Inc., 1993.

[22] L. Muche, "Contact and chord length distribution functions of the poisson-voronoi tessellation in high dimensions," *Advances in Applied Probability*, vol. 42, no. 1, pp. 48-68, March 2010.

[23] A. Merwaday and I. Guvenc, "Handover count based velocity estimation and mobility state detection in dense hetnets," *CoRR*, 2015.

What is claimed is:

1. A method of determining the velocity of a device in a wireless network, the method comprising:
   generating a handover count (H) of base station boundary transitions by the device;
   receiving the handover count (H) made by the device over a predefined time window (T);

determining a specific velocity estimate based on the handover count (H), the predefined time window (T), and a base station density ($\lambda$) as inputs to a velocity estimator; and returning the specific velocity estimate to the device itself and a wireless network controller through a base station, the base station density ($\lambda$) being periodically retrieved from the wireless network, and the velocity estimator being selected from the group consisting of a minimum variance unbiased estimator, a best linear unbiased estimator, a maximum likelihood estimator, a least squares estimator, a method of moments estimator, and a Bayesian estimator.

2. The method of claim 1, further comprising receiving the predefined time window (T) from the wireless network.

3. The method of claim 1, wherein the predefined time window (T) is from 25 seconds to 35 seconds.

4. The method of claim 1, further comprising receiving the base station density ($\lambda$) for a particular wireless network zone, wherein the device is located in the particular wireless network zone.

5. The method of claim 1, wherein ($\lambda$) is from 1000 to 10000 base stations per square kilometer.

6. The method of claim 1, further comprising:
receiving the specific velocity estimate at a component of the device, wherein the component modifies a local function of the device.

7. The method of claim 1, further comprising:
receiving the specific velocity estimate at the wireless network controller; and
adjusting a performance behavior of the wireless network using the specific velocity estimate.

8. The method of claim 1, wherein the wireless network comprises phantom cells.

9. A method of determining the velocity of a device in a wireless network, the method comprising:
receiving a vector T of N sojourn time samples, wherein each sojourn time sample denotes the duration the user device remains in a zone of a particular base station;
determining a specific velocity estimate based on a sojourn time by using the vector T and a base station density ($\lambda$) as inputs to a velocity estimator; and
returning the specific velocity estimate to the device itself and a wireless network controller through a base station, the base station density ($\lambda$) being periodically retrieved from the wireless network, and the velocity estimator being selected from the group consisting of a minimum variance unbiased estimator, a best linear unbiased estimator, a maximum likelihood estimator, a least squares estimator, a method of moments estimator, and a Bayesian estimator.

10. The method of claim 9, further comprising receiving the base station density ($\lambda$) for a particular wireless network zone, wherein the device is located in the particular wireless network zone.

11. The method of claim 9, further comprising:
receiving the specific velocity estimate at a component of the device, wherein the component adjusts a local parameter of the device.

12. The method of claim 9, further comprising:
receiving the specific velocity estimate at the wireless network controller; and
adjusting a performance behavior of the wireless network using the specific velocity estimate.

13. The method of claim 9, wherein the wireless network comprises one or more of a cellular network, a heterogeneous network, and a hyper-dense network.

14. The method of claim 9, wherein the wireless network comprises phantom cells.

* * * * *